United States Patent
Zhu et al.

(10) Patent No.: US 10,848,569 B2
(45) Date of Patent: Nov. 24, 2020

(54) SESSION PROCESSING METHOD AND RELATED DEVICE

(71) Applicant: HUAWEI TECHNOLOGIES CO., LTD., Guangdong (CN)

(72) Inventors: Fangyuan Zhu, Beijing (CN); Yan Li, Beijing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 16/292,802

(22) Filed: Mar. 5, 2019

(65) Prior Publication Data
US 2019/0199802 A1 Jun. 27, 2019

Related U.S. Application Data

(63) Continuation of application No. PCT/CN2018/084782, filed on Apr. 27, 2018.

(30) Foreign Application Priority Data

Jun. 1, 2017 (CN) .......................... 2017 1 0404353

(51) Int. Cl.
*G06F 15/173* (2006.01)
*H04L 29/08* (2006.01)
(Continued)

(52) U.S. Cl.
CPC .............. *H04L 67/14* (2013.01); *H04L 29/06* (2013.01); *H04W 24/04* (2013.01); *H04W 28/16* (2013.01);
(Continued)

(58) Field of Classification Search
CPC ........ H04L 67/14; H04L 29/06; H04W 28/16; H04W 36/00; H04W 36/0033;
(Continued)

(56) References Cited

U.S. PATENT DOCUMENTS

2015/0363174 A1\* 12/2015 Rose .......................... G06F 8/31
717/114
2017/0031726 A1\* 2/2017 Toeroe .................. G06F 9/5072
(Continued)

FOREIGN PATENT DOCUMENTS

CN 101296225 B 10/2008

OTHER PUBLICATIONS

Nokia et al: "Way forward for change of AMF / Control of N2 persistence", 3GPP Draft; S2-171485, Feb. 2017, XP051240721, total 8 pages.
(Continued)

*Primary Examiner* — Richard G Keehn

(57) ABSTRACT

In a session management method, when a first access and mobility management function (AMF) network element serving a terminal becomes unavailable, a service management function (SMF) network element obtains a pool identifier of an AMF pool that includes the first AMF, and queries a network repository function (NRF) entity to obtain the address or identifier of a second AMF in the same AMF pool. The SMF then triggers the second AMF network element to obtain a context of the terminal from a unstructured data storage function (UDSF) entity.

9 Claims, 13 Drawing Sheets

(51) Int. Cl.
  *H04W 24/04* (2009.01)
  *H04W 36/00* (2009.01)
  *H04W 28/16* (2009.01)
  *H04L 29/06* (2006.01)
  *H04W 80/10* (2009.01)
  *H04W 76/19* (2018.01)
  *H04W 68/00* (2009.01)

(52) U.S. Cl.
  CPC ....... *H04W 36/00* (2013.01); *H04W 36/0033* (2013.01); *H04W 68/005* (2013.01); *H04W 76/19* (2018.02); *H04W 80/10* (2013.01)

(58) Field of Classification Search
  CPC ... H04W 24/04; H04W 80/10; H04W 68/005; H04W 76/19
  See application file for complete search history.

(56) References Cited

U.S. PATENT DOCUMENTS

| | | | | |
|---|---|---|---|---|
| 2019/0182788 | A1* | 6/2019 | Lee | H04W 80/10 |
| 2020/0015158 | A1* | 1/2020 | So | H04W 48/18 |

OTHER PUBLICATIONS

Ericsson: "Principles for Change of AMF", 3GPP Draft; S2-170899, Feb. 2017, XP051228184, total 6 pages.
S2-170191 Nokia,"Solution for stickiness removal", SA WG2 Meeting #118bis. Jan. 16-20, 2017, Spokane, WA, USA,total 7 pages.
S2-173327 Ericsson et al.,"RRC Inactive state—new procedures in TS 23.502",SA WG2 Meeting #121,May 15-19, 2017, Hangzhou, China,total 16 pages.
S2-17300 Ericsson,"23.502: Introduction of RRC Inactive state related procedures",3GPP TSG-SA2 Meeting #120, Busan, Korea, Mar. 27-31, 2017,total 13 pages.
3GPP TS 23.007 V14.2.0 (Mar. 2017),3rd Generation Partnership Project;Technical Specification Group Core Network and Terminals;Restoration procedures(Release 14),total 98 pages.
S2-171885 Lenovo et al.,"TS 23.501: Proposals for change of AMF",SA WG2 Meeting #120,Mar. 27-31, 2017, Busan, Korea,total 3 pages.
S2-172044 Nokia,"TS 23.501: Way forward and Solution for change of AMF / Control of N2 persistence",SA WG2 Meeting #120,Mar. 27-31, 2017, Busan, Korea,total 17 pages.
3GPP TS 23.501 V0.4.0 (Apr. 2017),3rd Generation Partnership Project;Technical Specification Group Services and System Aspects; Systems Architecture for the 5G System;Stage 2(Release 15),total 124 pages.
3GPP TS 23.502 V0.3.0 (Mar. 2017),3rd Generation Partnership Project;Technical Specification Group Services and System Aspects;Procedures for the 5G System;Stage 2(Release 15),total 115 pages.
Huawei, HiSilicon, TS23.501: AMF Stickiness, 3GPP TSG SA WG2#119 S2-170984, Feb. 7, 2017,total 8 pages.
Huawei, HiSilicon, Network triggered Service Request Procedure, 3GPP TSG SA WG2#119 S2-170975, 3GPP, Feb. 7, 2017,total 10 pages.
Ericsson, Proposals for way forward for change of AMF, 3GPP TSG SA WG2#120 S2-171812, 3GPP, Mar. 21, 2017, total 13 pages.

* cited by examiner

SESSION PROCESSING METHOD AND RELATED DEVICE

CROSS-REFERENCE TO RELATED APPLICATIONS

This application is a continuation of International Application No. PCT/CN2018/084782, filed on Apr. 27, 2018, which claims priority to Chinese Patent Application No. 201710404353.1, filed on Jun. 1, 2017. The disclosures of the aforementioned applications are hereby incorporated by reference in their entireties.

TECHNICAL FIELD

The present disclosure relates to the field of communications technologies, and in particular, to a session processing method and a related device.

BACKGROUND

In a 5G system architecture, an access and mobility management function (AMF) network element, performs important functions such as access control, mobility management, attachment and detachment, and is a very important core network element. Once the AMF network element becomes unavailable due to a system upgrade, a power failure of a device, excessively heavy load, or another factor, a large quantity of mobile communication users cannot perform normal communication. Therefore, selecting an available AMF network element in a timely manner to take over an unavailable AMF network element is one of methods for resolving a problem that the AMF network element is unavailable.

Currently, when learning that a currently connected AMF network element is unavailable, a session management function (SMF) network element may re-select an available AMF network element to replace the unavailable AMF network element. The SMF network element is a network entity associated with a terminal session. When a terminal is served by only one SMF network element, the SMF network element re-selects an available AMF network element.

However, when the terminal is served by a plurality of SMF network elements associated with a plurality of sessions, when the plurality of SMF network elements simultaneously find that an AMF network element currently serving the terminal is unavailable, and downlink services of the plurality of sessions corresponding to the plurality of SMF network elements simultaneously arrive, available AMF network elements re-selected by the respective SMF network element may be different. Serving one terminal by using a plurality of AMF network elements may cause a procedure conflict. Therefore, in this scenario, how to ensure that the plurality of SMF network elements re-select a same available AMF network element is a problem that needs to be resolved.

SUMMARY

Embodiments of the present disclosure provide a session processing method and a related device. When a terminal has a plurality of sessions associated with a plurality of SMFs, it can be ensured that one second AMF network element triggering paging finally serves the terminal, thereby avoiding a procedure conflict caused by a plurality of AMF network elements serving one terminal.

According to a first aspect, an embodiment of the present disclosure provides a session processing method, including: upon learning, by a second access and mobility management function AMF network element from a first session management function SMF network element, that a first AMF network element serving a terminal is unavailable, obtaining, by the second AMF network element, a context of the terminal from a database, where the context of the terminal includes an identifier of the first SMF network element and an identifier of a second SMF network element; paging, by the second AMF network element, the terminal, and sending an identifier of the second AMF network element and a paging status indication to the database to update the context of the terminal, where the paging status indication indicates that the terminal is paged by the second AMF network element; and receiving, by the second AMF network element, a service request message from the terminal, where the service request message is used for establishment of a user plane resource for a session of the terminal.

In this technical solution, when the terminal has a plurality of sessions associated with a plurality of SMFs, even though the second SMF network element and the first SMF network element select different AMF network elements to replace the first AMF network element initially, it can be ensured, based on the identifier of the second AMF network element and the paging status indication in the context of the terminal, that the second AMF network element triggering paging finally serves the terminal, thereby avoiding a procedure conflict caused by a plurality of AMF network elements serving one terminal.

In a first possible implementation of the first aspect, the second AMF network element receives a first message from the first SMF network element. The first message includes a permanent identifier of the terminal and a cause value, the permanent identifier is used for acquisition of the context of the terminal, and the cause value indicates that the first AMF network element is unavailable.

With reference to the first possible implementation of the first aspect, in a second possible implementation of the first aspect, when the first message does not include a session management message, the second AMF network element further sends the identifier of the first SMF network element to the database to update the context of the terminal.

In this technical solution, the identifier of the second SMF network element indicates that a session corresponding to the second SMF network element has a downlink service. Therefore, after receiving the service request message of the terminal, the second AMF network element may establish a user plane resource for a second session associated with the second SMF network element.

With reference to any one of the first aspect, or the first or the second possible implementation of the first aspect, in a third possible implementation of the first aspect, the second AMF network element sends a paging message to the terminal. The paging message includes the identifier of the second AMF network element, or includes a temporary identifier of the terminal, and the temporary identifier includes the identifier of the second AMF network element.

With reference to the second or the third possible implementation of the first aspect, in a fourth possible implementation of the first aspect, the second AMF network element obtains the identifier of the first SMF network element and the identifier of the second SMF network element from the database, the second AMF network element sends a respective second message to the first SMF network element and the second SMF network element, and the first SMF network element and the second SMF respectively send a first session management message and a second session management message to the second AMF network element. The first session management message includes an identifier of a first session, and the identifier of the first session associates the first session with the first SMF network element. The second session management message includes an identifier of a second session, and the identifier of the second session associates the second session with the second SMF network element.

In this technical solution, the identifiers of the first SMF network element and the second SMF network element indicate that the sessions respectively corresponding to the first SMF network element and the second SMF network element have downlink services. Therefore, after receiving the service request message of the terminal, the second AMF network element may obtain the first session management message from the first SMF network element and obtain the second session management message from the second SMF network element. In this way, the second AMF network element triggers the first session associated with the first SMF network element and the second session associated with the second SMF network element, to establish the user plane resource.

According to a second aspect, an embodiment of the present disclosure provides another session processing method, including:

obtaining, by a third AMF network element, a context of a terminal from a database after receiving a service request message of the terminal from a base station, where the context of the terminal includes an identifier of a second AMF network element and a cause value, and the cause value indicates that a first AMF is unavailable; and sending, by the third AMF network element, the service request message to the second AMF network element, where the service request message is used for establishment of a user plane resource for a session of the terminal.

In this technical solution, the third AMF network element determines, based on the context of the terminal, that the second AMF network element has been determined as an AMF network element serving the terminal, so as to forward the service request message of the terminal to the second AMF network element for processing. Even though AMF network elements selected by the base station and a first SMF network element are different, it can be finally ensured that the AMF network element processing the service request message of the terminal is the same as the AMF network element triggering paging to the terminal.

According to a third aspect, an embodiment of the present disclosure provides another session processing method, including:

upon learning, by a third AMF network element from a second SMF network element, that a first AMF network element serving a terminal is unavailable, obtaining, by the third AMF network element, a context of the terminal from a database, where the context of the terminal includes an identifier of a second AMF network element and a paging status indication, and the paging status indication indicates that the terminal is paged by the second AMF network element; and sending, by the third AMF network element, an address of the second AMF network element or the identifier of the second AMF network element to the second SMF network element, or sending, by the third AMF network element, an identifier of the second SMF network element to the database, to update the context of the terminal.

In this technical solution, the third AMF network element determines, based on the context of the terminal, that the second AMF network element has been determined as an AMF network element serving the terminal, so as to send the address of the second AMF network element or the identifier of the second AMF network element to the second SMF network element, to instruct the second SMF network element to re-send a message to the second AMF, or send the identifier of the second SMF network element to the database. In this way, the second AMF network element learns, when obtaining the context, that a session corresponding to the second SMF network element has a downlink service, and processes the service. This ensures that the second AMF network element triggering paging finally serves the terminal, thereby avoiding a procedure conflict caused by a plurality of AMF network elements serving one terminal.

According to a fourth aspect, an embodiment of the present disclosure provides another session processing method, including:

obtaining, by an SMF network element, a pool identifier of an AMF pool to which a first AMF network element belongs; when the first AMF network element is unavailable, determining, by the SMF network element based on the pool identifier, a second AMF network element belonging to the same AMF pool as the first AMF network element; and triggering, by the SMF network element, the second AMF network element to obtain a context of a terminal to page the terminal.

In this technical solution, after learning that the first AMF network element is unavailable, the SMF network element may select the second AMF network element to replace the first AMF network element, and the second AMF network element does not delete the context of the terminal that has been locally stored. This ensures quick recovery of a session service of the terminal when the first AMF network element is unavailable, thereby improving reliability of the network element.

In a first possible implementation of the fourth aspect, the SMF network element searches, based on the pool identifier, locally stored AMF information for the second AMF network element having the same pool identifier as the first AMF network element. The AMF information includes an association between the second AMF network element and the pool identifier.

In this technical solution, the SMF network element may directly locally search for the second AMF network element having the same pool identifier as the first AMF network element, to speed up recovery of the session service, thereby improving reliability of the network element.

In a second possible implementation of the fourth aspect, the SMF network element sends a first query request message to a network repository function NRF entity, where the first query request message carries the pool identifier. The SMF network element receives an address of the second AMF network element or an identifier of the second AMF network element from the NRF entity.

In a third possible implementation of the fourth aspect, the SMF network element sends a second query request message to a database, where the second query request message carries the pool identifier. The SMF network element receives an address of the second AMF network element or an identifier of the second AMF network element from the database.

With reference to any one of the fourth aspect, or the first to the third possible implementations of the fourth aspect, in a fourth possible implementation of the fourth aspect, the SMF network element receives the pool identifier from the first AMF network element.

With reference to any one of the fourth aspect, or the first to the fourth possible implementations of the fourth aspect, in a fifth possible implementation of the fourth aspect, the SMF network element sends a third message to a third AMF network element based on the pool identifier. The first AMF network element and the third AMF network element belong to the same AMF pool, the third message carries a cause value, and the cause value indicates that the first AMF network element is unavailable. The SMF network element receives the address of the second AMF network element or the identifier of the second AMF network element from the third AMF network element.

In this technical solution, the third AMF network element is a network element selected by the SMF network element to replace the first AMF network element. The third AMF network element may send, based on the context, the address of the second AMF network element or the identifier of the second AMF network element to the second SMF network element, to notify the second SMF network element that the terminal is served by the second AMF network element. This ensures that the second AMF network element triggering paging finally serves the terminal, thereby avoiding a procedure conflict caused by a plurality of AMF network elements serving one terminal.

With reference to any one of the fourth aspect, or the first to the fifth possible implementations of the fourth aspect, in a sixth possible implementation of the fourth aspect, the SMF network element caches a session management message. The SMF network element sends the cached session management message to the second AMF network element after receiving a second message from the second AMF network element. The session management message includes an identifier of a session, and the identifier of the session associates the session with the SMF network element.

With reference to any one of the fourth aspect, or the first to the sixth possible implementations of the fourth aspect, in a seventh possible implementation of the fourth aspect, the SMF network element sends a first message to the second AMF network element. The first message includes a permanent identifier of the terminal and a cause value, the permanent identifier is used for acquisition of the context of the terminal, and the cause value indicates that the first AMF is unavailable.

According to a fifth aspect, an embodiment of the present disclosure provides another session processing method, including:

receiving, by a second AMF network element, a first message from an SMF network element, where the first message includes a cause value, and the cause value indicates that a first AMF serving a terminal is unavailable; paging, by the second AMF network element, the terminal, and sending an identifier of the second AMF network element and the cause value to a database to update a context of the terminal; and receiving, by the second AMF network element, a service request message from a third AMF network element, where the service request message is used for establishment of a user plane resource for a session of the terminal.

In this technical solution, after it is determined that the second AMF network element replaces the first AMF network element to serve the terminal, the second AMF network element sends the identifier of the second AMF network element and the cause value to the database, so that the third AMF network element may determine, based on the context of the terminal, that the second AMF network element has been determined as an AMF network element serving the terminal, and forward the service request message of the terminal to the second AMF network element for processing, thereby finally ensuring that the AMF network element processing the service request message of the terminal is the same as the AMF network element triggering paging to the terminal.

According to a sixth aspect, an embodiment of the present disclosure provides another session processing method, including:

upon learning, by a second AMF network element from an SMF network element, that a first AMF network element serving a terminal is unavailable, sending, by the second AMF network element, a paging message to the terminal, where the paging message includes an identifier of the second AMF network element, or includes a temporary identifier of the terminal, and the temporary identifier includes the identifier of the second AMF network element; and receiving, by the second AMF network element, a service request message from the terminal, where the service request message is used for establishment of a user plane resource for a session of the terminal.

In this technical solution, after it is determined that the second AMF network element replaces the first AMF network element to serve the terminal, the second AMF network element sends the paging message to the terminal. The paging message includes the identifier of the second AMF network element or the temporary identifier of the terminal. In this way, the service request message sent by the terminal also carries the identifier of the second AMF network element. Therefore, a base station may send the service request message of the terminal to the second AMF network element for processing, thereby finally ensuring that the AMF network element processing the service request message of the terminal is the same as the AMF network element triggering paging to the terminal.

A seventh aspect of this application provides a network element. The network element includes a processor, a memory, and a transceiver. The processor is connected to the memory and the transceiver. For example, the processor may be connected to the memory and the transceiver by using a bus. The transceiver is configured to communicate with another network device. The memory is configured to store a service request message and the like. The processor is configured to perform some or all procedures in any one of the first aspect, the second aspect, the third aspect, the fourth aspect, the fifth aspect, or the sixth aspect.

An eighth aspect of this application provides another network element. The network element includes a receiving module and a sending module. The sending module and the receiving module are configured to implement the transceiver in the seventh aspect. The network element implements some or all steps of the method in any one of the first aspect, the second aspect, the third aspect, the fourth aspect, the fifth aspect, or the sixth aspect by using the foregoing modules.

A ninth aspect of this application provides a storage medium. The storage medium stores program code. When the program code is run on a computing device, the computing device performs the session processing method according to the first aspect or any implementation of any one of the first aspect, the second aspect, the third aspect, the fourth aspect, the fifth aspect, or the sixth aspect. The storage medium includes but is not limited to a flash memory, a hard disk drive (HDD), or a solid-state drive (SSD).

A tenth aspect of this application provides a computer program product. When the computer product is run on a computing device, the computing device performs the session processing method according to the first aspect or any implementation of any one of the first aspect, the second aspect, the third aspect, the fourth aspect, the fifth aspect, or the sixth aspect.

BRIEF DESCRIPTION OF DRAWINGS

To describe the technical solutions in the embodiments of the present disclosure or in the background more clearly, the following briefly describes the accompanying drawings for describing the embodiments of the present disclosure or the background.

DESCRIPTION OF EMBODIMENTS

The following describes the embodiments of the present disclosure with reference to the accompanying drawings in the embodiments of the present disclosure.

Figure 1:
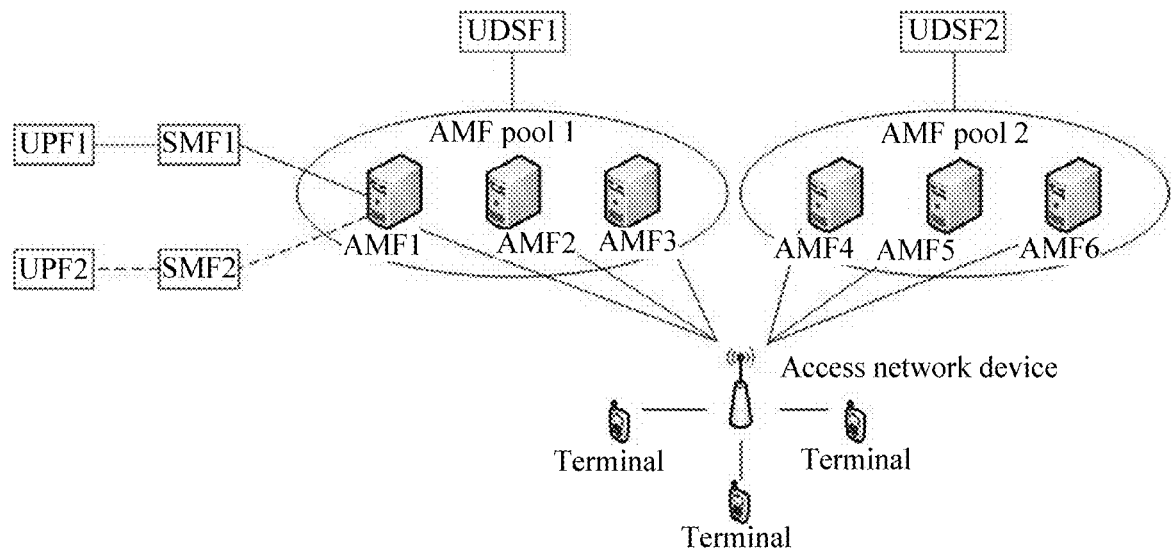
FIG. 1 is a schematic architectural diagram of a communications system according to an embodiment of this application.

Referring to FIG. 1, FIG. 1 is a schematic architectural diagram of a communications system according to an embodiment of this application. Descriptions of various network elements are as follows:

Terminal: which may be a user equipment (UE). The UE is a device accessing a network side by using a base station. For example, the UE may be a handheld terminal device, a notebook computer, a subscriber unit, a cellular phone, a smartphone, a wireless data card, a personal digital assistant (PDA) computer, a tablet computer, a wireless modem, a handheld device, a laptop computer, a cordless phone or a wireless local loop (WLL) station, a machine type communication (MTC) terminal, or another device that can access a network. The UE may communicate with the base station by using an air interface technology.

Radio access network (RAN) device: mainly responsible for functions such as radio resource management, quality of service (QoS) management, and data compression and encryption on an air interface side. The access network device may include various base stations, for example, a macro base station, a micro base station (also referred to as a small cell), a relay station, or an access point. In systems using different radio access technologies, a device having a function of a base station may be named differently. For example, the device is referred to as a gNB in a 5th generation (5G) system, referred to as an evolved NodeB (eNB or eNodeB) in a long term evolution (LTE) system, or referred to as a NodeB in a 3rd generation (3G) system.

AMF network element: belonging to a core network element, and mainly responsible for a signaling processing part, that is, control plane functions, including functions such as access control, mobility management, attachment and detachment.

SMF network element: responsible for user-plane network element selection, user-plane network element redirection, Internet Protocol (IP) address assignment, bearer establishment, modification, and release, and QoS control.

User plane function (UPF) entity: responsible for functions such as user packet forwarding, encapsulation, and counting.

The base station is connected to at least one terminal and at least one AMF network element. The at least one AMF network element belongs to one AMF pool. The AMF pool is equivalent to a set of a plurality of AMF network elements, and the plurality of AMF network elements in each AMF pool may share contexts of all UEs that are stored in an unstructured data storage function (UDSF) network element corresponding to the AMF pool. In other words, the plurality of AMF network elements serve a same wireless area (AMF pool area). The plurality of AMF network elements in the AMF pool are interconnected with access network devices in the AMF pool area. The plurality of AMF network elements in the AMF pool share resources and service load. One AMF network element may be connected to at least one SMF network element, and configured to establish a session with the terminal. A UPF network element is connected to a corresponding SMF network element, and configured to transmit data on a user plane.

In an example in FIG. 1, an AMF1, an AMF2, and an AMF3 belong to an AMF pool 1, and share a UDSF1; and an AMF4, an AMF5, and an AMF6 belong to an AMF pool 2, and share a UDSF2. An SMF1 and an SMF2 may be connected to any AMF network element in the AMF pool 1. The SMF1 and the SMF2 are respectively connected to a UPF1 and a UPF2. It may be understood that, FIG. 1 is merely an example, and the embodiments of this application are not limited thereto.

Figure 2:
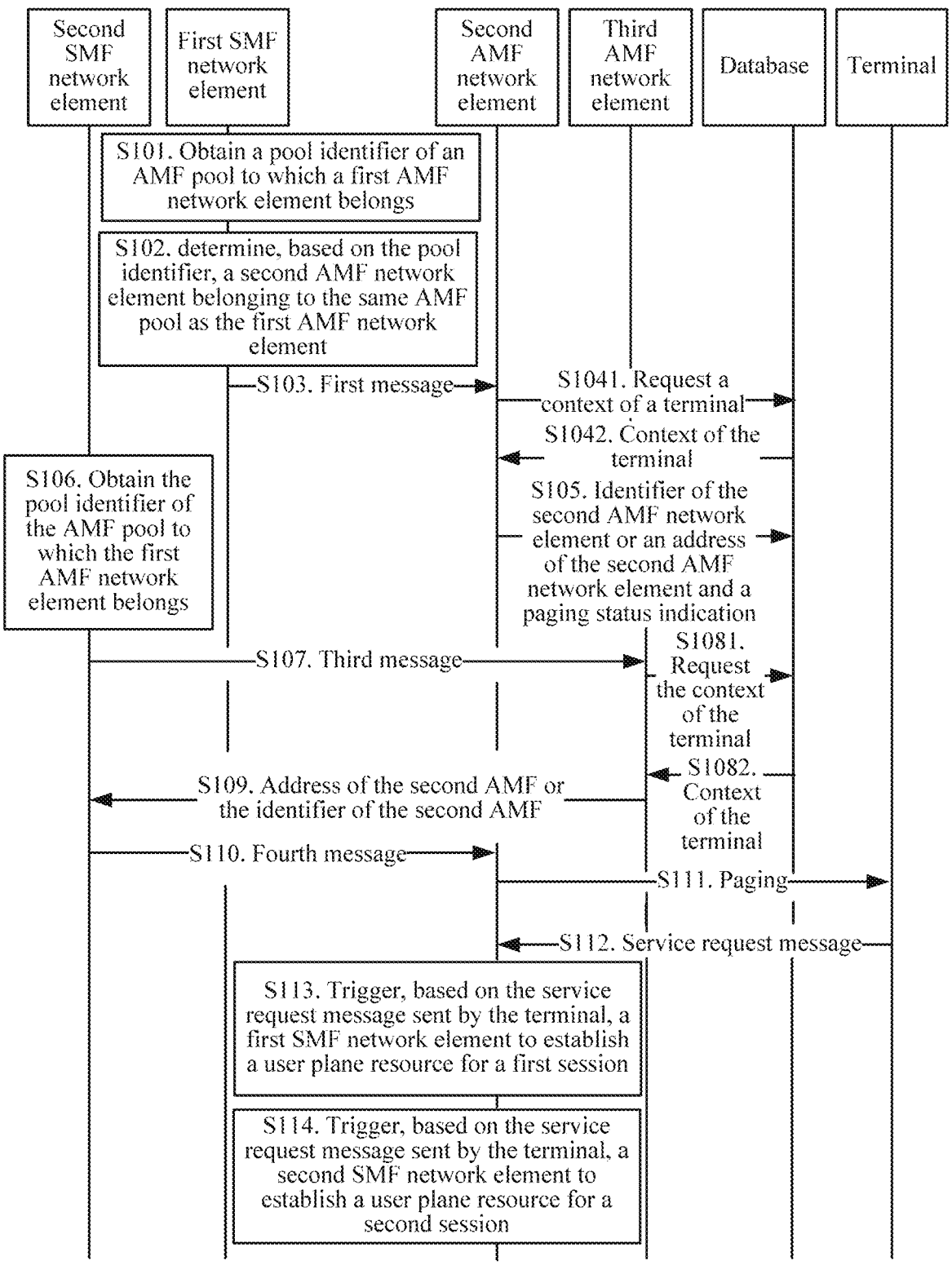
FIG. 2 is a schematic flowchart of a session processing method according to an embodiment of this application.

Referring to FIG. 2, FIG. 2 is a schematic flowchart of a session processing method according to an embodiment of the present disclosure. In this embodiment, a terminal establishes a plurality of sessions associated with a plurality of SMFs. The method includes but is not limited to the following steps.

S101. A first SMF network element obtains a pool identifier of an AMF pool to which a first AMF network element belongs.

The first SMF network element may obtain, by using a plurality of methods, the pool identifier of the AMF pool to which the first AMF network element belongs.

In a possible implementation, the first SMF network element may send a request message to the first AMF network element, to request the pool identifier of the AMF pool to which the first AMF network element belongs.

In another possible implementation, alternatively, signaling sent by the first AMF network element to the first SMF network element may carry the pool identifier of the AMF pool to which the first AMF network element belongs, so that the first SMF network element obtains the pool identifier of the AMF pool to which the first AMF network element belongs. For example, the terminal attaches to the first AMF network element during registration. In this case, the first AMF network element may send, to the first SMF network element, the pool identifier of the AMF pool to which the first AMF network element belongs.

S102. When the first AMF network element is unavailable, the first SMF network element determines, based on the pool identifier, a second AMF network element belonging to the same AMF pool as the first AMF network element.

For example, the first SMF network element may learn, by using an echo detection mechanism between interfaces of the first SMF network element and the first AMF network element, that the first AMF network element is unavailable. Herein, the being unavailable may include a case in which the first AMF is faulty or restarted, or may include a case in which load balancing needs to be performed on the first AMF network element due to excessively heavy service load.

When learning that the first AMF network element is unavailable, the first SMF network element may determine, based on the pool identifier of the AMF pool to which the first AMF network element belongs, the second AMF network element belonging to the same AMF pool as the first AMF network element. In other words, the first SMF network element selects, as the second AMF network element, one of a plurality of AMF network elements included in the AMF pool to which the first AMF network element belongs, to provide a service for the terminal.

There may be a plurality of manners of determining the second AMF network element. Examples are as follows:

In a first possible implementation, the first SMF network element locally stores a context including AMF information. The AMF information may reflect an association between at least one AMF network element and a pool identifier of an AMF pool to which the respective AMF network element of the at least one AMF network element belongs. For example, the AMF information may include an identifier or an address of the at least one AMF network element, and a pool identifier of an AMF pool to which the respective AMF network element belongs. The first SMF network element may search, based on the pool identifier of the AMF pool to which the first AMF network element belongs, the locally stored AMF information for a second AMF network element having the same pool identifier as the first AMF network element, to obtain an address of the second AMF network element or an identifier of the second AMF network element. Herein, the AMF information stored in the first SMF network element may be information about the at least one AMF network element connected to the first SMF network element, or may be preconfigured information of the at least one AMF network element. This is not limited herein.

In a second possible implementation, the first SMF network element may send a first query request message to a network repository function (NRF) entity. The first query request message carries the pool identifier of the AMF pool to which the first AMF network element belongs. The NRF entity searches, based on the first query request message, the locally stored AMF information for a second AMF network element having the same pool identifier as the first AMF network element, obtains an address of the second AMF network element or an identifier of the second AMF network element, and sends the address or the identifier to the first SMF network element.

In a third possible implementation, the first SMF network element may send a second query request message to a structured data storage function (SDSF) network element via a network exposure function (NEF) entity. The second query request message carries the pool identifier of the AMF pool to which the first AMF network element belongs. The SDSF network element searches, based on the second query request message, the locally stored AMF information for a second AMF network element having the same pool identifier as the first AMF network element, obtains an address of the second AMF network element or an identifier of the second AMF network element, and sends the address or the identifier to the first SMF network element.

It should be noted that, the foregoing three manners of determining the second AMF network element may be used in combination. Optionally, the locally stored AMF information of the first SMF network element may be searched for the address or the identifier of the second AMF network element by using the first implementation. When no proper result is found, the address or the identifier of the second AMF network element is obtained by using the second or the third implementation.

Further, when the first SMF network element learns that the first AMF network element is unavailable, and receives a signaling message (for example, a data notification message) sent by a first UPF entity, step S102 is triggered and performed. When the first SMF network element learns that the first AMF network element is unavailable, and receives a downlink data packet sent by the first user plane entity, the first SMF network element needs to send the downlink data packet to the terminal by using a control plane. In this implementation, when performing step S102, the first SMF network element may first cache the downlink data packet, wait for establishment of a user plane resource, and then send the downlink data packet to the terminal.

After determining the second AMF network element, the first SMF network element may notify the second AMF network element that the first AMF network element serving the terminal is unavailable. In the embodiment shown in FIG. 2, step S103 may be performed.

S103. The first SMF network element sends a first message to the second AMF network element.

The first message may include a permanent identifier of the terminal and a cause value. The permanent identifier is used by the second AMF network element to obtain a context of the terminal, and the cause value indicates that the first AMF network element is unavailable. In this way, the second AMF network element learns that the second AMF network element needs to replace the first AMF network element to provide a service for the terminal. Further, the first message may further include a first session management message. The first session management message includes an identifier of a first session. The identifier of the first session is used to notify the second AMF network element to associate the first session with the first SMF network element.

S104. The second AMF network element obtains a context of the terminal from a database, where the context of the terminal includes an identifier of the first SMF network element and an identifier of a second SMF network element.

In this embodiment, step S104 may specifically include step S1041 and step S1042.

S1041. The second AMF network element requests the database for the context of the terminal.

S1042. The database sends the context of the terminal to the second AMF network element, where the context of the terminal includes the identifier of the first SMF network element and the identifier of the second SMF network element.

For example, the database herein is a UDSF database. Because the second AMF network element and the first AMF network element belong to the same AMF pool, the second AMF network element and the first AMF network element share one UDSF database. After receiving the first message, the second AMF network element may query the context of the terminal from the UDSF database based on the permanent identifier of the terminal. In this embodiment, the context of the terminal includes identifiers of a plurality of SMF network elements, for example, the identifiers include the identifier of the first SMF network element and the identifier of the second SMF network element. Herein, the second SMF network element may be a particular SMF network element, or may broadly be an SMF network element different from the first SMF network element. Herein, the context of the terminal received by the second AMF network element includes the identifier of the first SMF network element and the identifier of the second SMF network element, and may be used to notify the second AMF network element that in addition to the first SMF network element, there is another SMF network element associated with the terminal.

Optionally, the context of the terminal further includes a first temporary identifier of the terminal and a tracking area list of the terminal. The first temporary identifier is allocated by the first AMF network element to the terminal, and is used to uniquely identify the terminal in the first AMF. The tracking area list is used by the second AMF network element to initiate paging to the terminal in all tracking areas included in the tracking area list.

S105. The second AMF network element sends an identifier of the second AMF network element or an address of the second AMF network element, and sends a paging status indication to the database to update the context of the terminal.

The second AMF network element may determine, based on the identifier of the first SMF network element and the identifier of the second SMF network element included in the context, that the terminal has a plurality of sessions, that is, is served by a plurality of SMF network elements. In this case, the second AMF network element may send the identifier of the second AMF network element or the address of the second AMF network element and the paging status indication to the UDSF database. The UDSF database updates the identifier of the second AMF network element or the address of the second AMF network element and the paging status indication to the context of the terminal. The paging status indication indicates that the terminal is paged by the second AMF network element.

After step S104, step S111 may be performed when, before, or after step S105 is performed. An execution sequence is not limited herein.

Further, in the following step S106 to step S110, step S108 to step S110 are performed after step S105. Therefore, step S108 to step S110 may be performed at the same time as step S111, or step S108 to step S110 may be performed after step S111. This is not limited herein.

S106. The second SMF network element obtains the pool identifier of the AMF pool to which the first AMF network element belongs.

A manner of the second SMF network element obtaining the pool identifier of the AMF pool to which the first AMF network element belongs is similar to the manner of the first SMF network element obtaining the pool identifier of the AMF pool to which the first AMF network element belongs. For details, refer to descriptions in step S101, and details are not described herein again.

S107. The second SMF network element sends a third message to a third AMF network element based on the pool identifier, where the first AMF network element and the third AMF network element belong to the same AMF pool.

When learning that the first AMF network element is unavailable, the second SMF network element may determine, based on the pool identifier of the AMF pool to which the first AMF network element belongs, the third AMF network element belonging to the same AMF pool as the first AMF network element. In other words, the second SMF network element selects, as the third AMF network element, one of the plurality of AMF network elements included in the AMF pool to which the first AMF network element belongs. The third AMF network element is different from the second AMF network element. A manner of determining the third AMF network element is consistent with the manner of determining the second AMF network element in step S102, and details are not described herein again.

After the third AMF network element is determined, the second SMF network element may send the third message to the third AMF network element. The third message may include a permanent identifier of the terminal and a cause value. The permanent identifier is used by the third AMF network element to obtain the context of the terminal, and the cause value indicates that the first AMF network element is unavailable. In this way, the third AMF network element learns that the third AMF network element needs to replace the first AMF network element to provide a service for the terminal. Further, the third message may further include a second session management message. The second session management message includes an identifier of a second session. The identifier of the second session is used to notify the third AMF network element to associate the second session with the second SMF network element.

Similarly, when the second SMF network element learns that the first AMF network element is unavailable, and receives a signaling message (for example, a data notification message) sent by a second UPF, step S102 is triggered and performed. When the second SMF network element learns that the first AMF network element is unavailable, and receives a downlink data packet sent by the second user plane entity, the second SMF network element needs to send the downlink data packet to the terminal by using a control plane. In this implementation, when performing step S102, the second SMF network element may first cache the downlink data packet, wait for establishment of a user plane resource, and then send the downlink data packet to the terminal.

S108. The third AMF network element obtains the context of the terminal from the database, where the context of the terminal includes the identifier of the second AMF network element or the address of the second AMF and the paging status indication.

In this embodiment, step S108 may specifically include step S1081 and step S1082.

S1081. The third AMF network element requests the database for the context of the terminal.

S1082. The database sends the context of the terminal to the third AMF network element, where the context of the terminal includes the identifier of the second AMF network element or the address of the second AMF, and further includes the paging status indication.

For example, the database herein is the foregoing UDSF database. Because the third AMF network element and the first AMF network element belong to the same AMF pool, the third AMF network element and the first AMF network element share one UDSF database. After receiving the third message, the third AMF network element may query the context of the terminal from the UDSF database based on the permanent identifier of the terminal. The second AMF network element was first selected by the first SMF network element as a network element that replaces the first AMF network element to serve the terminal, the second AMF network element triggers paging to the terminal, and in step S105, the context of the terminal includes the identifier of the second AMF network element or the address of the second AMF network element and further includes the paging status indication. Therefore, the third AMF network element may learn, based on the context of the terminal, that the terminal is paged by the second AMF network element, and the third AMF network element does not need to additionally page the terminal, and does not need to perform a step similar to step S105.

S109. The third AMF network element sends the address of the second AMF or the identifier of the second AMF to the second SMF network element.

The third AMF network element may send the address of the second AMF or the identifier of the second AMF to the second SMF network element, so that the second SMF network element may learn that the terminal is paged by the second AMF network element.

S110. The second SMF network element sends a fourth message to the second AMF network element based on the address of the second AMF network element or the identifier of the second AMF.

The second SMF network element learns that the second AMF network element actually serves the terminal. Therefore, the second SMF network element sends the fourth message to the second AMF network element. Consistent with content carried in the third message, the fourth message may include the permanent identifier of the terminal and the cause value. The permanent identifier is used by the second AMF network element to obtain the context of the terminal, and the cause value indicates that the first AMF network element is unavailable. In this way, the second AMF network element learns that the second AMF network element needs to replace the first AMF network element to provide a service for the terminal. Further, the fourth message may further include the second session management message. The second session management message includes the identifier of the second session. The identifier of the second session is used to notify the second AMF network element to associate the second session with the second SMF network element.

In this way, when the terminal has a plurality of sessions associated with a plurality of SMFs, even though the second SMF network element and the first SMF network element initially select different AMF network elements to replace the first AMF network element, it can be ensured that the second AMF network element triggering paging finally serves the terminal, thereby avoiding a procedure conflict caused by a plurality of AMF network elements serving one terminal.

S111. The second AMF network element pages the terminal.

After obtaining the context of the terminal, the second AMF network element may page the terminal based on the context. Specifically, the second AMF network element may send a paging message to the terminal. The paging message may include the identifier of the second AMF network element, or, include a temporary identifier of the terminal while the temporary identifier includes the identifier of the second AMF network element. For a specific paging method, refer to paging processes in embodiments shown in FIG. 4 to FIG. 6B, and details are not described in this embodiment.

S112. After receiving the paging, the terminal sends a service request message to the second AMF network element.

The service request message carries the temporary identifier of the terminal, and is used to trigger the second AMF network element to establish a user plane resource for a session of the terminal.

S113. The second AMF network element triggers, based on the service request message sent by the terminal, the first SMF network element to establish a user plane resource for a first session.

After receiving the service request message of the terminal, the second AMF network element may obtain the permanent identifier of the terminal from the locally stored context based on the temporary identifier of the terminal. The context of the terminal has been obtained from the database in step S1081 and step S1082. The second AMF network element requests a unified data management (UDM) library for subscription data of the terminal based on the permanent identifier of the terminal.

Further, the second AMF network element learns, by using the first session management message obtained from the first message in step S103, that the first SMF network element is associated with the first session. In this way, the second AMF network element may learn that the first SMF network element needs to be triggered to establish the user plane resource for the first session. Further, the second AMF network element performs service request procedure processing based on the service request message, to trigger the first SMF network element to establish the user plane resource for the first session.

Further, if the first SMF network element first caches the downlink data packet coming from the first UPF entity, after establishing the user plane resource for the first session, the first SMF network element may then send the cached downlink data packet to the terminal.

S114. The second AMF network element triggers, based on the service request message sent by the terminal, the second SMF network element to establish a user plane resource for a second session.

The second AMF network element learns, by using the second session management message obtained from the fourth message in step S110, that the second SMF network element is associated with the second session. In this way, the second AMF network element may learn that the second SMF network element needs to be triggered to establish the user plane resource for the second session. Further, the second AMF network element performs service request procedure processing based on the service request message, to trigger the second SMF network element to establish the user plane resource for the second session.

Further, if the second SMF network element first caches the downlink data packet coming from the second UPF entity, after establishing the user plane resource for the second session, the second SMF network element may then send the cached downlink data packet to the terminal.

Therefore, after receiving the paging message, the terminal no longer needs to initiate a re-attachment procedure, and the second AMF network element does not delete the context of the terminal that has been locally stored. This ensures quick recovery of a session service of the terminal when the first AMF network element is unavailable, thereby improving reliability of the network element.

It can be learned that, in the embodiment shown in FIG. 2, step S101 to step S105 show how the first SMF network element selects the second AMF network element that replaces the first AMF network element, step S106 to step S110 show how the second SMF network element determines the second AMF network element that replaces the first AMF network element, and step S111 to step S114 are a procedure showing that the second AMF network element pages the terminal and re-establishes the user plane resource for the terminal session. Unless otherwise particularly stated in this embodiment, an execution sequence of steps in the procedures of step S101 to step S105, step S106 to step S110, and step S111 to step S114 is not limited.

Figure 3A:
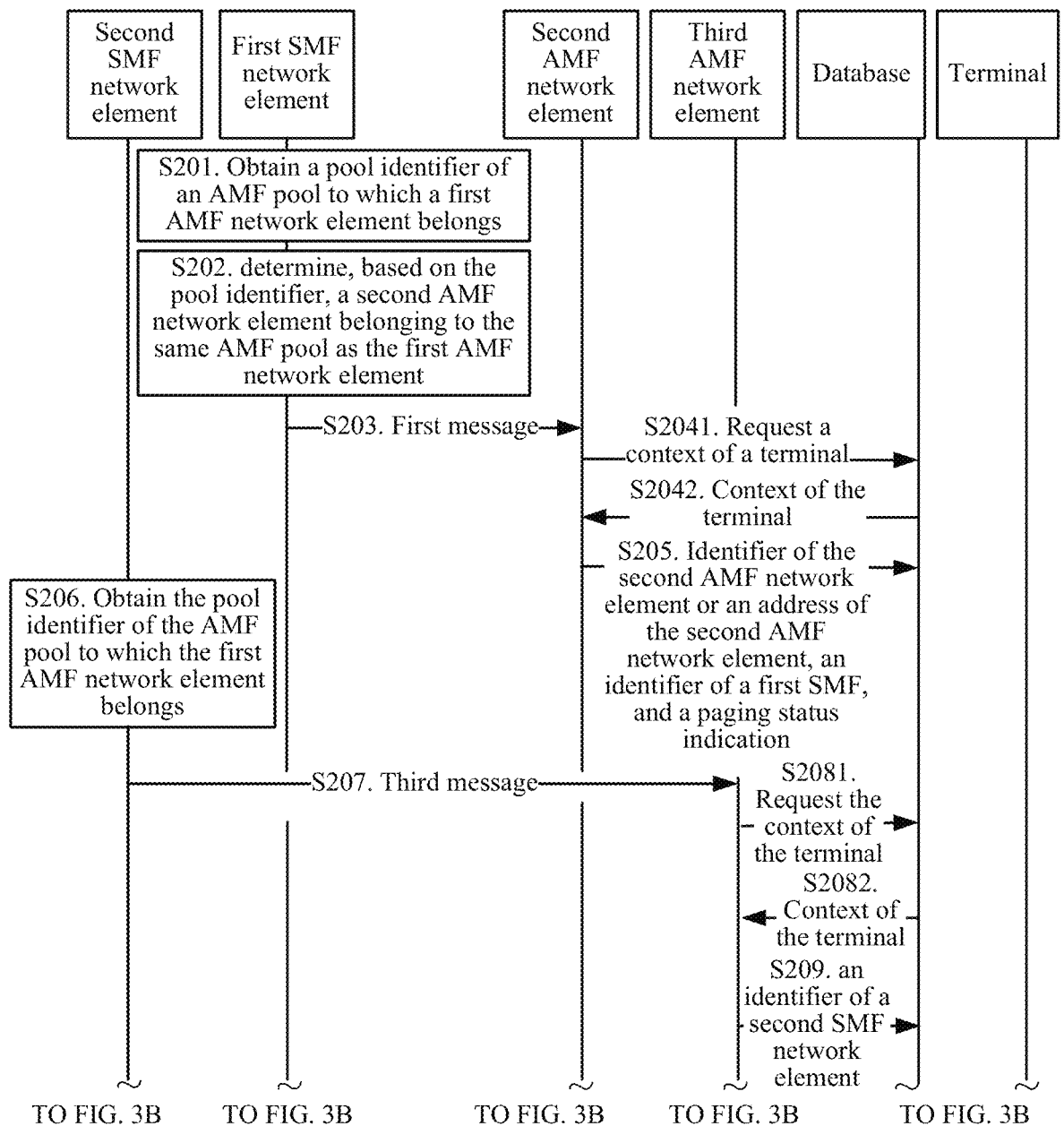
FIG. 3A and FIG. 3B are schematic flowcharts of another session processing method according to an embodiment of this application.
Figure 3B:
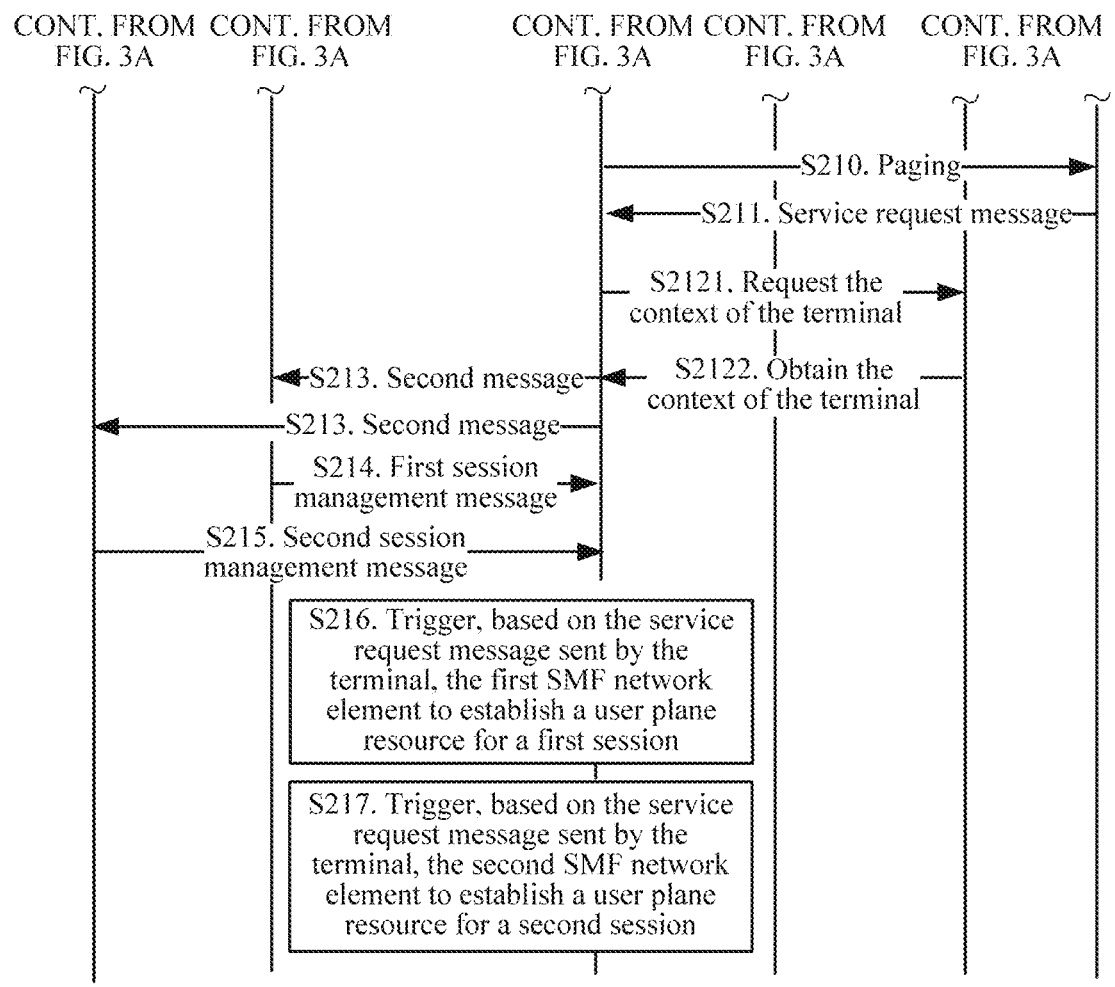

Referring to FIG. 3A and FIG. 3B, FIG. 3A and FIG. 3B are schematic flowcharts of another session processing method according to an embodiment of the present disclosure.

In this embodiment, a terminal establishes a plurality of sessions associated with a plurality of SMFs. The method includes but is not limited to the following steps.

S201. A first SMF network element obtains a pool identifier of an AMF pool to which a first AMF network element belongs.

For a specific implementation of step S201, refer to step S101, and details are not described herein again.

S202. When the first AMF network element is unavailable, the first SMF network element determines, based on the pool identifier, a second AMF network element belonging to the same AMF pool as the first AMF network element.

For a specific implementation of step S202, refer to step S102, and details are not described herein again.

After determining the second AMF network element, the first SMF network element may notify the second AMF network element that the first AMF network element serving the terminal is unavailable. In the embodiment shown in FIG. 3A and FIG. 3B, step S203 may be specifically performed.

S203. The first SMF network element sends a first message to the second AMF network element.

A difference between this embodiment and the embodiment shown in FIG. 2 lies in that, the first message in this embodiment does not include a first session management message. That is, the first SMF network element temporarily does not send the first session management message to the second AMF network element, but locally caches the first session management message. For other parts, refer to descriptions in step S103, and details are not described herein again.

S204. The second AMF network element obtains a context of the terminal from a database, where the context of the terminal includes an identifier of the first SMF network element and an identifier of a second SMF network element.

In this embodiment, step S204 may specifically include step S2041 and step S2042.

S2041. The second AMF network element requests the database for the context of the terminal.

S2042. The database sends the context of the terminal to the second AMF network element, where the context of the terminal includes the identifier of the first SMF network element and the identifier of the second SMF network element.

In this embodiment, the terminal is served by the plurality of SMF network elements associated with the plurality of sessions. For example, the plurality of SMF network elements may be an SMF1 network element, an SMF2 network element, and an SMF3 network element. In this case, an identifier of the SMF1 network element, an identifier of the SMF2 network element, and an identifier of the SMF3 network element are obtained in step S204. In this case, the second SMF network element may broadly be an SMF network element different from the first SMF network element. For a specific implementation of step S204, refer to step S104, and details are not described herein again.

S205. The second AMF network element sends an identifier of the second AMF network element or an address of the second AMF network element, and sends the identifier of the first SMF, and a paging status indication to the database to update the context of the terminal.

A difference between this embodiment and the embodiment shown in FIG. 2 lies in that, the first message received by the second AMF network element in this embodiment does not include the first session management message. Therefore, in addition to sending the identifier of the second AMF network element or the address of the second AMF network element and the paging status indication to a UDSF database, the second AMF network element further sends the identifier of the first SMF network element to the UDSF database. The identifier of the first SMF network element indicates that a session corresponding to the first SMF network element has a downlink service. The UDSF database updates the identifier of the second AMF network element or the address of the second AMF network element, the identifier of the first SMF, and the paging status indication to the context of the terminal. Optionally, the second AMF network element may further send identifier indication information to the database. In this case, the identifier indication information indicates that the session corresponding to the first SMF network element has a downlink service. Correspondingly, the UDSF database also updates the identifier indication information to the context of the terminal. For other parts, refer to descriptions in step S105, and details are not described herein again.

After step S205, step S210 may further be performed.

Further, in the following step S206 to step S209, step S208 and step S209 are performed after step S205. Therefore, step S208 and step S209 may be performed at the same time as step S210, or step S208 and step S209 may be performed after step S210. This is not limited herein.

S206. The second SMF network element obtains the pool identifier of the AMF pool to which the first AMF network element belongs.

For a specific implementation of step S206, refer to step S106, and details are not described herein again.

S207. The second SMF network element sends a third message to a third AMF network element based on the pool identifier, where the first AMF network element and the third AMF network element belong to the same AMF pool.

A difference between this embodiment and the embodiment shown in FIG. 2 lies in that, the third message in this embodiment does not include a second session management message. That is, the second SMF network element temporarily does not send the second session management message to the second AMF network element, but locally caches the second session management message. For other parts, refer to descriptions in step S107, and details are not described herein again.

Similarly, when the second SMF network element learns that the first AMF network element is unavailable, and receives a signaling message (for example, a data notification message) sent by a second UPF entity, step S207 is triggered and performed. When the second SMF network element learns that the first AMF network element is unavailable, and receives a downlink data packet sent by the second user plane entity, the second SMF network element needs to send the downlink data packet to the terminal by using a control plane. In this implementation, when performing step S207, the second SMF network element may first cache the downlink data packet, wait for establishment of a user plane resource, and then send the downlink data packet to the terminal.

S208. The third AMF network element obtains the context of the terminal from the database, where the context of the terminal includes the identifier of the second AMF network element or the address of the second AMF and the paging status indication.

In this embodiment, step S208 may specifically include step S2081 and step S2082.

S2081. The third AMF network element requests the database for the context of the terminal.

S2082. The database sends the context of the terminal to the third AMF network element, where the context of the terminal includes the identifier of the second AMF network element or the address of the second AMF and includes the paging status indication.

For a specific implementation of step S208, refer to step S108, and details are not described herein again.

In this way, when the terminal has a plurality of sessions associated with a plurality of SMFs, even though the second SMF network element and the first SMF network element initially select different AMF network elements to replace the first AMF network element, it can be ensured that the second AMF network element triggering paging finally serves the terminal, thereby avoiding a procedure conflict caused by a plurality of AMF network elements serving one terminal.

S209. The third AMF network element sends an identifier of the second SMF network element to the database to update the context of the terminal.

The third AMF network element may send the identifier of the second SMF network element to the UDSF database, and the UDSF database updates the identifier of the second SMF network element to the context of the terminal. The identifier of the second SMF network element indicates that a session corresponding to the second SMF network element has a downlink service. Optionally, the third AMF network element may further send identifier indication information to the database. In this case, the identifier indication information indicates that the session corresponding to the second SMF network element has a downlink service. Correspondingly, the UDSF database also updates the identifier indication information to the context of the terminal.

S210. The second AMF network element pages the terminal.

For a specific implementation of step S210, refer to step S111, and details are not described herein again.

S211. After receiving the paging, the terminal sends a service request message to the second AMF network element.

For a specific implementation of step S211, refer to step S112, and details are not described herein again.

S212. The second AMF network element obtains the context of the terminal from the database.

In this embodiment, step S212 may specifically include step S2121 and step S2122.

S2121. The second AMF network element requests the database for the context of the terminal.

S2122. The database sends the context of the terminal to the second AMF network element.

The context of the terminal includes the identifier of the first SMF network element and the identifier of the second SMF network element. In this way, the second AMF network element may learn that the session corresponding to the first SMF network element and the session corresponding to the second SMF network element have downlink services. For example, the context obtained in step S204 includes three identifiers SMF1, SMF2, and SMF3, the identifier SMF1 is updated in step S205, and the identifier SMF2 is updated in step S209. In this case, the terminal may determine, based on the context, that sessions corresponding to SMF1 and SMF2 have downlink services.

S213. The second AMF network element sends a respective second message to the first SMF network element and the second SMF network element.

The second message sent to the first SMF network element is used by the second AMF network element to request the first SMF network element for the first session management message, and the second message sent to the second SMF network element is used by the second AMF network element to request the second SMF network element for the second session management message, so that the first SMF network element and the second SMF network element establish user plane resources for the first session and the second session by using the second AMF network element.

S214. The first SMF network element sends a cached first session management message to the second AMF network element.

S215. The second SMF network element sends a cached second session management message to the second AMF network element.

The first session management message includes an identifier of the first session, and the identifier of the first session is used to notify the second AMF network element to associate the first session with the first SMF network element. The second session management message includes an identifier of the second session, and the identifier of the second session is used to notify the second AMF network element to associate the second session with the second SMF network element. In this way, the second AMF network element may determine that each of the first and the second SMF network elements need to be triggered to establish a user plane resource for a corresponding session.

S216. The second AMF network element triggers, based on the service request message sent by the terminal, the first SMF network element to establish a user plane resource for a first session.

For a specific implementation of step S216, refer to step S113, and details are not described herein again.

S217. The second AMF network element triggers, based on the service request message sent by the terminal, the second SMF network element to establish a user plane resource for a second session.

For a specific implementation of step S217, refer to step S114, and details are not described herein again.

Therefore, after receiving a paging message, the terminal no longer needs to initiate a re-attachment procedure, and the second AMF network element does not delete the context of the terminal that has been locally stored. This ensures quick recovery of a session service of the terminal when the first AMF network element is unavailable, thereby improving reliability of the network element.

It can be learned that, in the embodiment shown in FIG. 3A and FIG. 3B, step S201 to step S205 show how the first SMF network element selects the second AMF network element that replaces the first AMF network element, step S206 to step S209 show how the second SMF network element determines the second AMF network element that replaces the first AMF network element, and step S210 to step S217 are a procedure showing that the second AMF network element pages the terminal and re-establishes the user plane resource for the terminal session. Unless otherwise particularly stated in this embodiment, an execution sequence of steps in the procedures of step S201 to step S205, step S206 to step S209, and step S210 to step S217 is not limited.

Referring to FIG. 4 to FIG. 6B, FIG. 4 to FIG. 6B are schematic flowcharts of three session processing methods according to embodiments of the present disclosure. In the embodiments, a terminal is served by only one SMF, and the SMF may be associated with a plurality of sessions, or may be associated with only one session. The method includes but is not limited to the following steps.

S301. A first SMF network element obtains a pool identifier of an AMF pool to which a first AMF network element belongs.

S302. When the first AMF network element is unavailable, the first SMF network element determines, based on the pool identifier, a second AMF network element belonging to the same AMF pool as the first AMF network element.

After determining the second AMF network element, the first SMF network element may notify the second AMF network element that the first AMF network element serving the terminal is unavailable. In the embodiments shown in FIG. 4 to FIG. 6B, step S303 may be specifically performed.

S303. The first SMF network element sends a first message to the second AMF network element.

For specific implementations of step S301 to step S303, refer to step S101 to step S103, and details are not described herein again.

S304. The second AMF network element obtains a context of the terminal from a database, where the context of the terminal includes a first temporary identifier of the terminal.

In the embodiments, step S304 may specifically include step S3041 and step S3042.

S3041. The second AMF network element requests the database for the context of the terminal.

S3042. The database sends the context of the terminal to the second AMF network element, where the context of the terminal includes the first temporary identifier of the terminal.

Because the second AMF network element and the first AMF network element belong to the same AMF pool, the second AMF network element and the first AMF network element share one UDSF database. After receiving the first message, the second AMF network element may query the context of the terminal from the UDSF database based on a permanent identifier of the terminal. In the embodiments, the context of the terminal includes the first temporary identifier of the terminal. The first temporary identifier of the terminal is allocated by the first AMF network element to the terminal, and for example, is a temporary mobile subscriber identity (TMSI). The first temporary identifier includes an identifier of the first AMF network element and an identifier of the terminal in the AMF pool to which the first AMF belongs.

Further, the context of the terminal includes a tracking area list, used by the second AMF network element to page the terminal in a tracking area included in the tracking area list.

Figure 4:
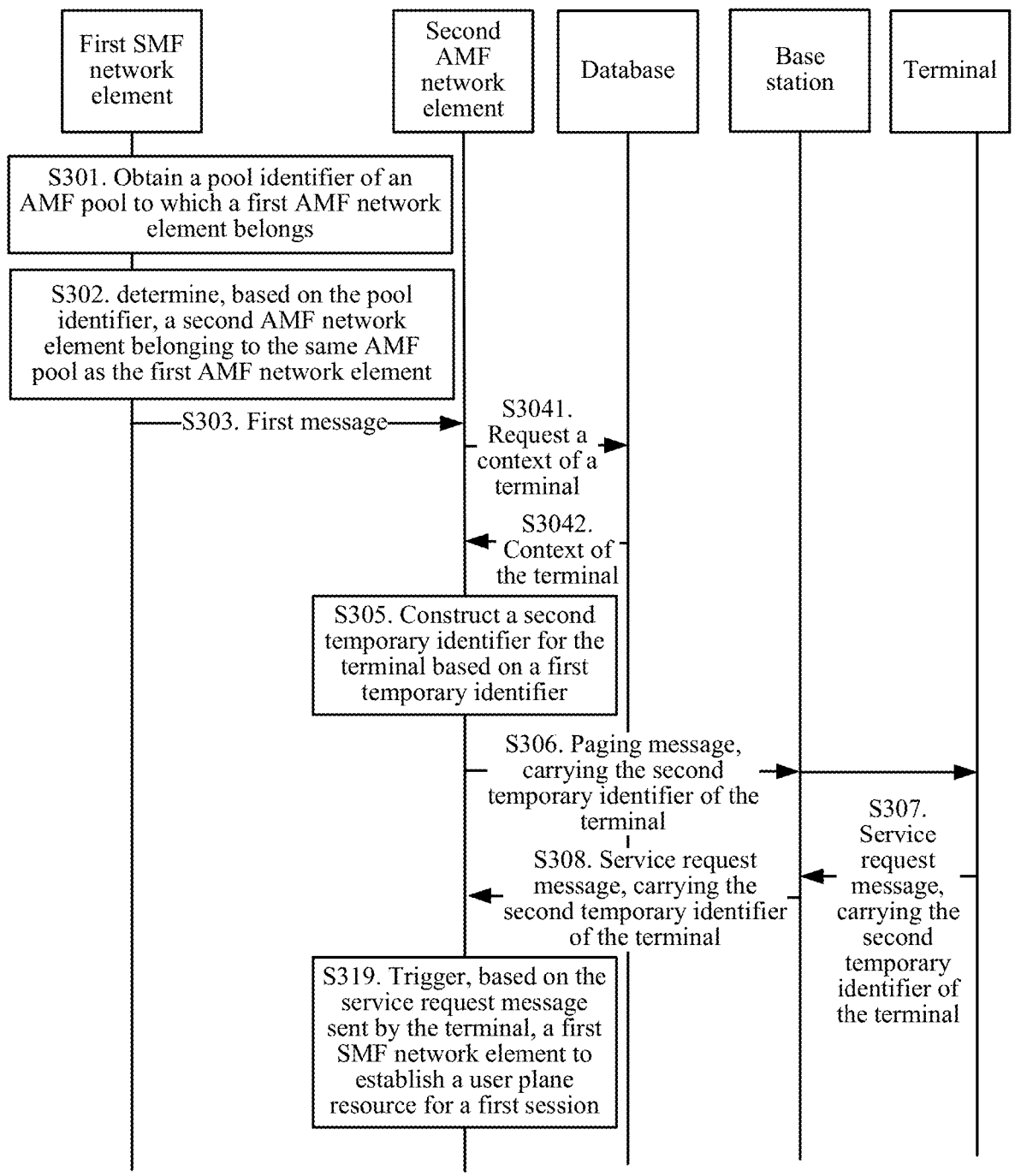
FIG. 4 is a schematic flowchart of another session processing method according to an embodiment of this application.

In the embodiment shown in FIG. 4, after step S304, step S305 to step S308, and step S319 are performed.

S305. The second AMF network element constructs a second temporary identifier for the terminal based on the first temporary identifier, where the second temporary identifier includes an identifier of the second AMF network element.

The second AMF network element replaces the identifier of the first AMF network element in the first temporary identifier with the identifier of the second AMF network element, so as to construct the second temporary identifier for the terminal. That is, the second temporary identifier includes the identifier of the second AMF network element and the identifier of the terminal in the AMF pool. It should be noted that, in the embodiment shown in FIG. 4, the identifier of the terminal in the AMF pool is unique in the AMF pool. Therefore, the base station can page the terminal based on the identifier of the terminal in the AMF pool.

S306. The second AMF network element sends a paging message to the terminal, where the paging message carries the second temporary identifier of the terminal.

The second AMF network element sends the paging message to the terminal in the tracking area included in the tracking area list. The paging message carries the second temporary identifier of the terminal.

S307. After receiving the paging message, the terminal sends a service request message to a base station, where the service request message carries the second temporary identifier of the terminal.

After receiving the paging message, the terminal sends the service request message to the base station. The service request message carries the second temporary identifier of the terminal, and the second temporary identifier indicates the second AMF network element serving the terminal.

S308. The base station sends the service request message to the second AMF network element based on the second temporary identifier of the terminal.

The second temporary identifier of the terminal includes the identifier of the second AMF network element. Therefore, the base station may determine, based on the second temporary identifier in the service request message, that the second AMF network element serves the terminal, so as to send the service request message to the second AMF network element.

This ensures that an AMF network element processing the service request message of the terminal is the same as an AMF network element triggering paging to the terminal.

Figure 5:
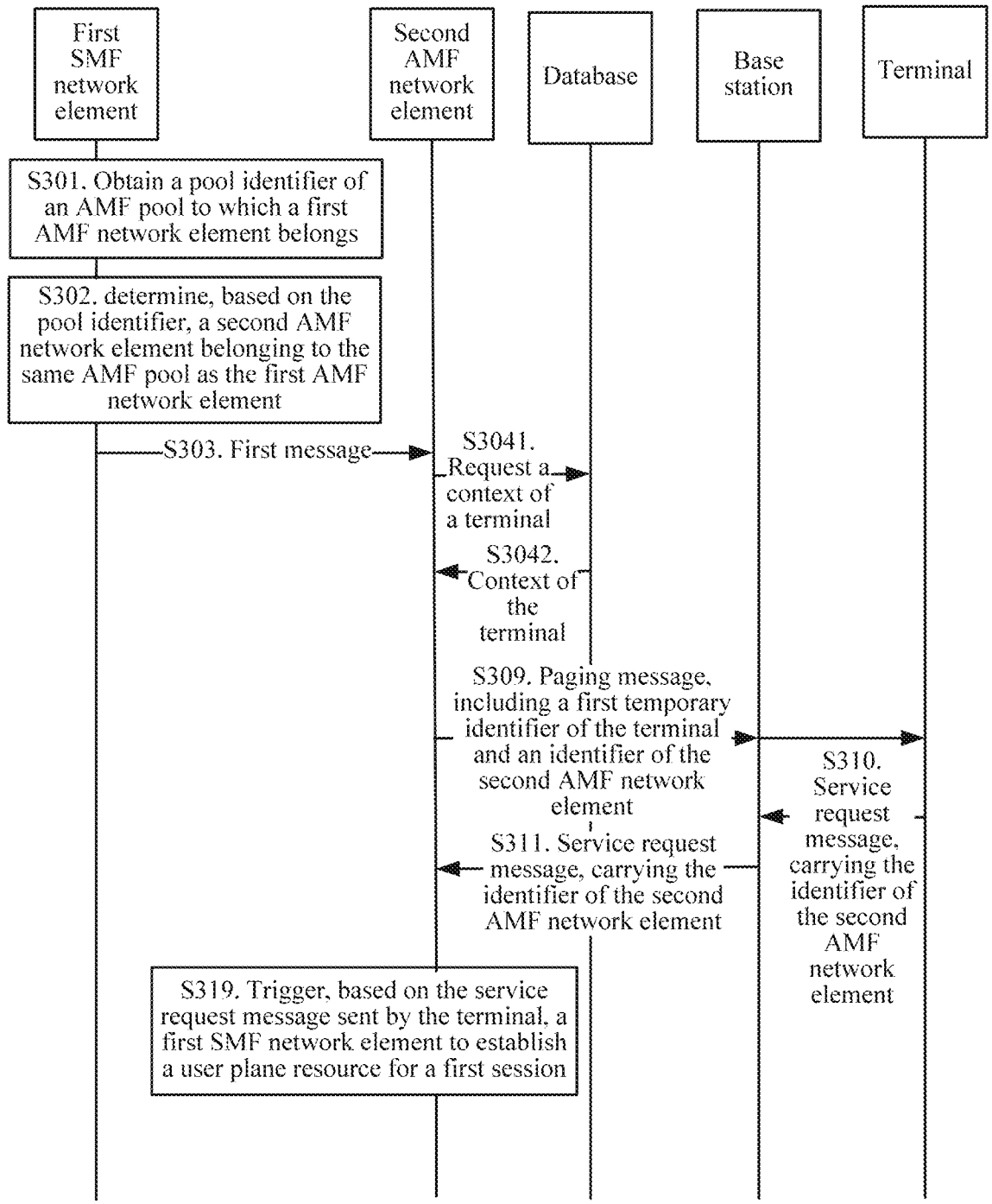
FIG. 5 is a schematic flowchart of another session processing method according to an embodiment of this application.

In the embodiment shown in FIG. 5, after step S304, step S309 to step S311, and step S319 are performed.

S309. The second AMF network element sends a paging message to the terminal, where the paging message includes the first temporary identifier of the terminal and an identifier of the second AMF network element.

The second AMF network element sends the paging message to the terminal in the tracking area included in the tracking area list. The paging message includes the first temporary identifier of the terminal and the identifier of the second AMF network element. The first temporary identifier of the terminal includes the identifier of the first AMF network element and the identifier of the terminal in the AMF pool. It should be noted that, in the embodiment shown in FIG. 5, the identifier of the terminal in the AMF pool is unique only in an AMF network element in the AMF pool, but is not necessarily unique in the AMF pool.

S310. After receiving the paging, the terminal sends a service request message to a base station, where the service request message carries the identifier of the second AMF network element.

After receiving the paging, the terminal sends the service request message to the base station. The service request message carries the identifier of the second AMF network element, and the identifier of the second AMF network element indicates the second AMF network element serving the terminal.

S311. The base station sends the service request message to the second AMF based on the identifier of the second AMF network element.

The base station may determine, based on the identifier of the second AMF network element in the service request message, that the second AMF network element serves the terminal, so as to send the service request message to the second AMF network element. This ensures that an AMF network element processing the service request message of the terminal is the same as an AMF network element triggering paging to the terminal.

Figure 6A:
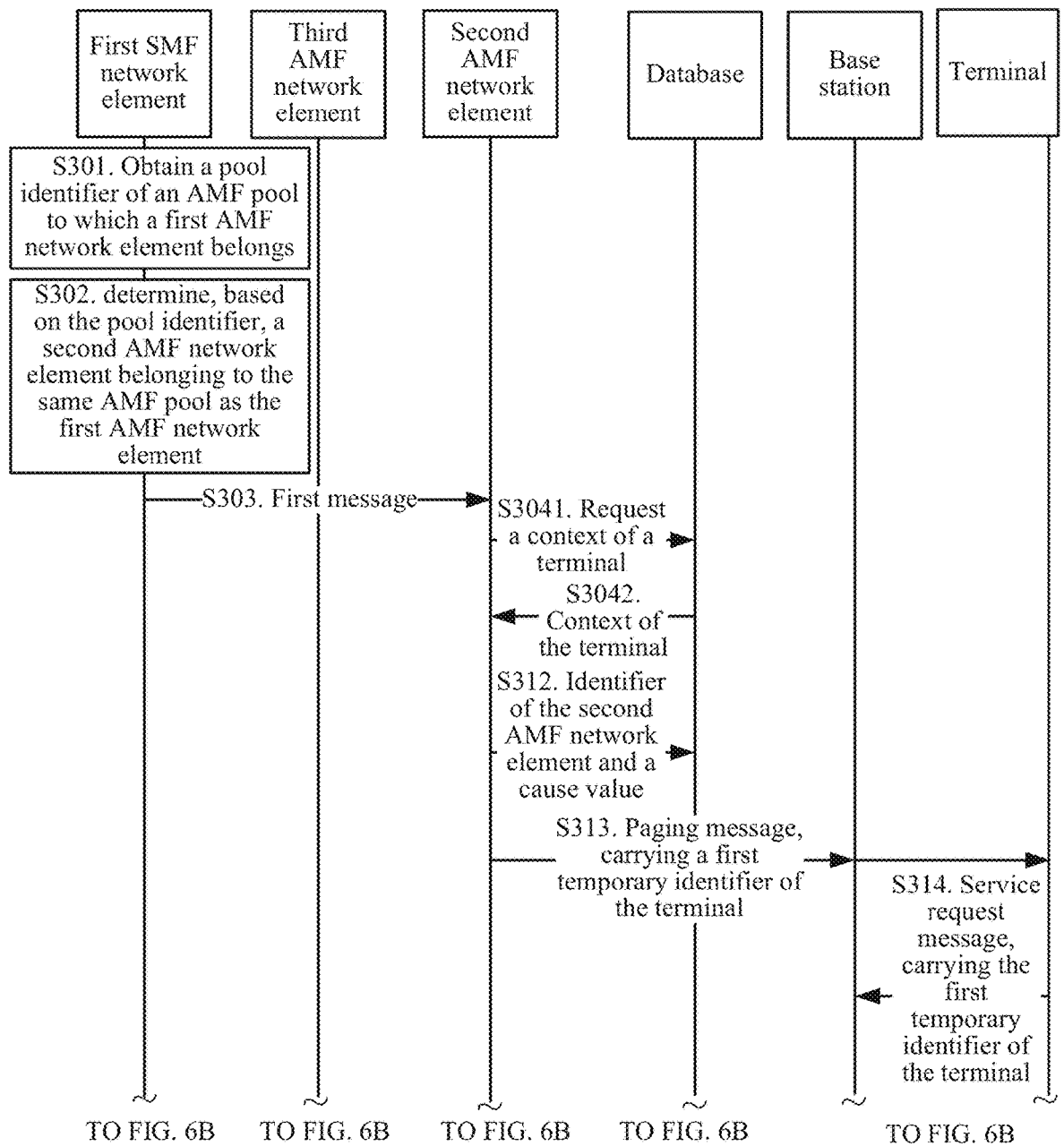
FIG. 6A and FIG. 6B are schematic flowcharts of another session processing method according to an embodiment of this application.
Figure 6B:
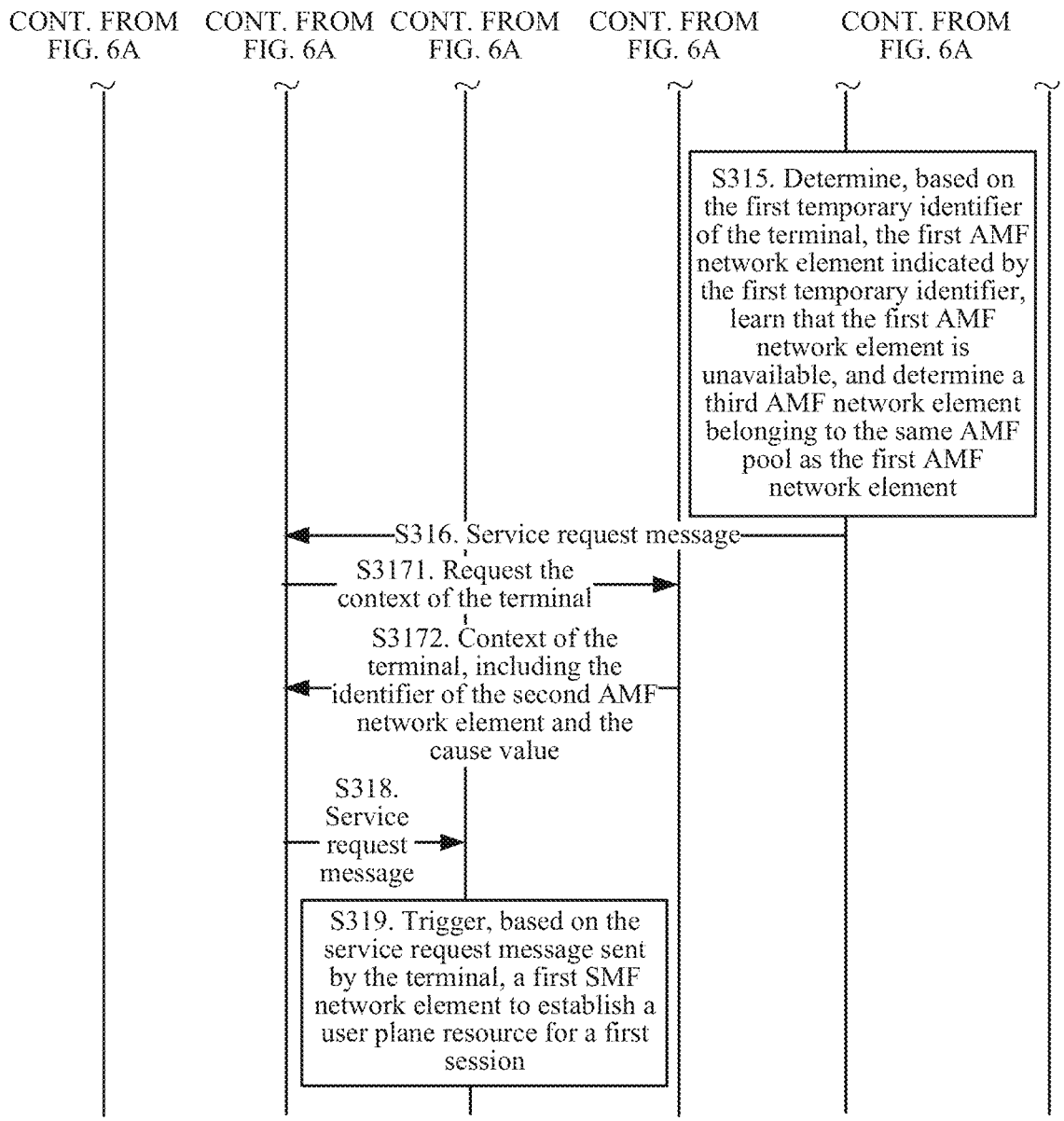

In the embodiment shown in FIG. 6A and FIG. 6B, after step S304, step S312 to step S319 are performed.

S312. The second AMF network element sends an identifier of the second AMF network element and a cause value to the database to update the context of the terminal.

The second AMF network element may send the identifier of the second AMF network element and the cause value to the UDSF database, and the UDSF database updates the identifier of the second AMF network element and the cause value to the context of the terminal. The cause value indicates that the first AMF network element is unavailable, and the identifier of the second AMF network element indicates that the terminal is served by the second AMF network element.

S313. The second AMF network element sends a paging message to the terminal, where the paging message carries the first temporary identifier of the terminal.

The second AMF network element sends the paging message to the terminal in the tracking area included in the tracking area list. The paging message includes the first temporary identifier of the terminal. The first temporary identifier of the terminal includes the identifier of the first AMF network element and the identifier of the terminal in the AMF pool. It should be noted that, in the embodiment shown in FIG. 6A and FIG. 6B, the identifier of the terminal in the AMF pool is unique only in an AMF network element in the AMF pool, but is not necessarily unique in the AMF pool.

S314. After receiving the paging message, the terminal sends a service request message to a base station, where the service request message carries the first temporary identifier of the terminal.

After receiving the paging message, the terminal sends the service request message to the base station. The service request message carries the first temporary identifier of the terminal, and the first temporary identifier indicates the first AMF network element that served the terminal.

S315. The base station determines, based on the first temporary identifier of the terminal, the first AMF network element indicated by the first temporary identifier, learns that the first AMF network element is unavailable, and determines a third AMF network element belonging to the same AMF pool as the first AMF network element.

After receiving the service request message, the base station may determine the first AMF network element based on the identifier of the first AMF network element in the first temporary identifier. Further, in a possible implementation, when the first AMF network element becomes unavailable due to load, the first AMF network element informs the base station that the first AMF network element no longer provides a service for the terminal. In this way, the base station may learn that the first AMF network element is unavailable. In another possible implementation, when the first AMF network element becomes unavailable due to a fault or restart, the base station learns, based on a connection between interfaces of the base station and the first AMF network element, that the first AMF network element currently cannot provide a service for the terminal. When learn that the first AMF network element is unavailable, the base station randomly determines, based on the pool identifier of the AMF pool to which the first AMF network element belongs that is known during pre-configuration, a third AMF network element belonging to the same AMF pool as the first AMF network element.

S316. The base station sends the service request message to the third AMF network element, where the service request message carries the first temporary identifier of the terminal.

S317. The third AMF network element obtains the context of the terminal from the database, where the context of the terminal includes the identifier of the second AMF network element and the cause value.

In this embodiment, step S317 may specifically include step S3171 and step S3172.

S3171. The third AMF network element requests the database for the context of the terminal.

S3172. The database sends the context of the terminal to the third AMF network element, where the context of the terminal includes the identifier of the second AMF network element and the cause value.

Because the third AMF network element and the first AMF network element belong to the same AMF pool, the third AMF network element and the first AMF network element share one UDSF database. Because the third AMF does not locally store the context of the terminal, after receiving the service request message, the third AMF network element may query the context of the terminal from the UDSF database based on the first temporary identifier carried in the service request message. The identifier of the second AMF network element and the cause value have been added to the context of the terminal in step S312. Therefore, the third AMF network element may learn that the terminal is served by the second AMF network element.

S318. The third AMF network element sends the service request message to the second AMF network element.

After learning that the terminal is served by the second AMF network element, the third AMF network element may forward the service request message of the terminal to the second AMF network element.

Therefore, even though AMF network elements initially selected by the base station and the first SMF network element are different, it can be ensured that finally an AMF network element processing the service request message of the terminal is the same as an AMF network element triggering paging to the terminal.

S319. The second AMF network element triggers, based on the service request message sent by the terminal, the first SMF network element to establish a user plane resource for a first session.

For a specific implementation of step S319, refer to step S113, and details are not described herein again.

Therefore, after receiving the paging message, the terminal no longer needs to initiate a re-attachment procedure, and the second AMF network element does not delete the context of the terminal that has been locally stored. This ensures quick recovery of a session service of the terminal when the first AMF network element is unavailable, thereby improving reliability of the network element.

Figure 7:
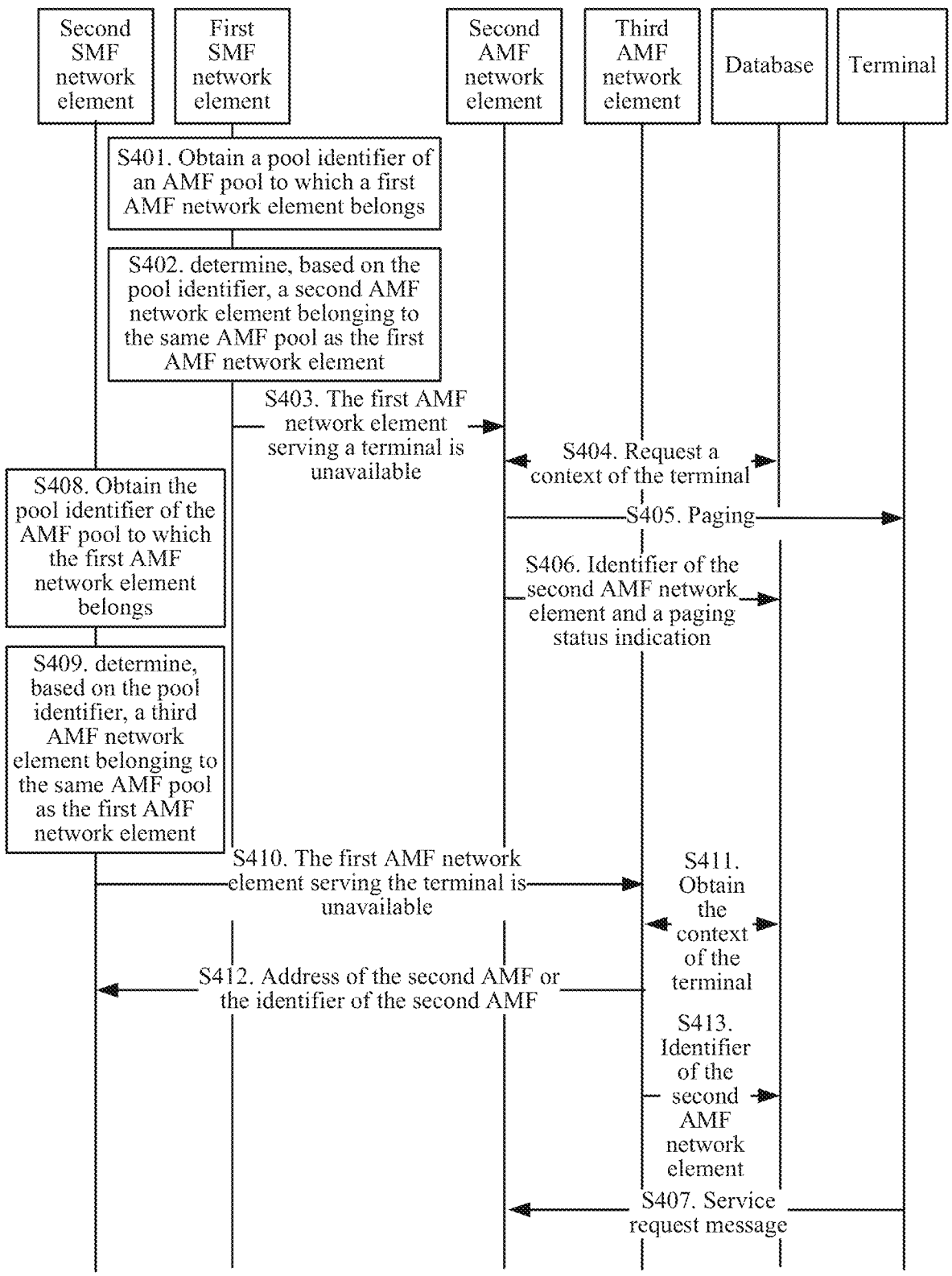
FIG. 7 is a schematic flowchart of another session processing method according to an embodiment of this application.

Referring to FIG. 7, FIG. 7 is a schematic flowchart of another session processing method according to an embodiment of the present disclosure. The method includes but is not limited to the following steps.

S401. A first SMF network element obtains a pool identifier of an AMF pool to which a first AMF network element belongs.

Optionally, the first SMF network element receives the pool identifier from the first AMF network element.

For a specific implementation of step S401, refer to step S101, and details are not described herein again.

S402. When the first AMF network element is unavailable, the first SMF network element determines, based on the pool identifier, a second AMF network element belonging to the same AMF pool as the first AMF network element.

In a possible implementation, the first SMF network element searches, based on the pool identifier, locally stored AMF information for a second AMF network element having the same pool identifier as the first AMF network element. The AMF information includes an association between the second AMF network element and the pool identifier.

In another possible implementation, the first SMF network element sends a first query request message to a network repository function NRF entity, where the first query request message carries the pool identifier. The first SMF network element receives an address of the second AMF network element or an identifier of the second AMF network element from the NRF entity.

In still another possible implementation, the first SMF network element sends a second query request message to a database, where the second query request message carries the pool identifier. The first SMF network element receives an address of the second AMF network element or an identifier of the second AMF network element from the database.

After step S402, triggering, by the first SMF network element, the second AMF network element to obtain a context of a terminal to page the terminal may include the following steps.

S403. The second AMF network element learns, from the first SMF network element, that the first AMF network element serving a terminal is unavailable.

In an optional implementation, the second AMF network element receives a first message from the first SMF network element. The first message includes a permanent identifier of the terminal and a cause value, the permanent identifier is used for acquisition of the context of the terminal, and the cause value indicates that the first AMF network element is unavailable.

In a first possible implementation of this embodiment, the first message may further include a first session management message, the first session management message includes an identifier of a first session, and the identifier of the first session is used to notify the second AMF network element to associate the first session with the first SMF network element.

In a second possible implementation of this embodiment, the first message may not include a first session management message. That is, the first SMF network element temporarily does not send the first session management message to the second AMF network element, but locally caches the first session management message.

S404. The second AMF network element obtains a context of the terminal from a database, where the context of the terminal includes an identifier of the first SMF network element and an identifier of a second SMF network element.

For a specific implementation of step S404, refer to step S104, and details are not described herein again.

S405. The second AMF network element pages the terminal.

Optionally, the second AMF network element sends a paging message to the terminal. The paging message includes the identifier of the second AMF network element, or, includes a temporary identifier of the terminal while the temporary identifier includes the identifier of the second AMF network element.

For a specific implementation of step S405, refer to step S111, step S304 to step S306, step S309, or step S312 and step S313, and details are not described herein again.

S406. The second AMF network element sends an identifier of the second AMF network element and a paging status indication to the database to update the context of the terminal.

The second AMF network element may determine, based on the identifier of the first SMF network element and the identifier of the second SMF network element included in the context, that the terminal has a plurality of sessions, that is, is served by a plurality of SMF network elements. In this case, the second AMF network element may send the identifier of the second AMF network element or the address of the second AMF network element, and sends the paging status indication to a UDSF database. The UDSF database updates the identifier of the second AMF network element or the address of the second AMF network element and updates the paging status indication to the context of the terminal. The paging status indication indicates that the terminal is paged by the second AMF network element.

Optionally, when the first message received in step S403 does not include a session management message, the second AMF network element further sends the identifier of the first SMF network element to the database to update the context of the terminal. For a specific implementation method, refer to step S205, and details are not described herein again.

Step S405 and step S406 may be performed at the same time, or a sequence may be changed during execution. An execution sequence is not limited herein.

Further, this embodiment includes some of step S408 to step S413. Step S408 to step S413 are performed after step S406 and before step S407.

S408. The second SMF network element obtains the pool identifier of the AMF pool to which the first AMF network element belongs.

S409. When the second AMF network element is unavailable, the second SMF network element determines, based on the pool identifier, a third AMF network element belonging to the same AMF pool as the first AMF network element.

S410. The third AMF network element learns, from the second SMF network element, that the first AMF network element serving the terminal is unavailable.

For specific implementations of step S408 to step S410, refer to step S401 to step S403, and details are not described herein again.

S411. The third AMF network element obtains the context of the terminal from the database, where the context of the terminal includes the identifier of the second AMF network element and the paging status indication.

The paging status indication indicates that the terminal is paged by the second AMF network element.

In the first possible implementation of this embodiment, for a specific implementation of step S411, refer to step S105, and step S412 is further performed.

In the second possible implementation of this embodiment, for a specific implementation of step S411, refer to step S205, and step S413 is further performed.

S412. The third AMF network element sends an address of the second AMF network element or the identifier of the second AMF network element to the second SMF network element.

For a specific implementation of step S412, refer to step S109, and details are not described herein again.

S413. The third AMF network element sends the identifier of the second SMF network element to the database to update the context of the terminal.

For a specific implementation of step S413, refer to step S209, and details are not described herein again.

S407. The second AMF network element receives a service request message from the terminal, where the service request message is used for establishment of a user plane resource for a session of the terminal.

After receiving the service request message of the terminal, the second AMF network element may obtain the permanent identifier of the terminal from the locally stored context based on the temporary identifier of the terminal. The context of the terminal has been obtained from the database. The second AMF network element requests a UDM library for subscription data of the terminal based on the permanent identifier of the terminal.

In the first possible implementation of this embodiment, the first message includes the first session management message. In this case, the second AMF network element determines, by using the first session management message obtained from the first message, the first SMF network element associated with the first session. In this way, the second AMF network element may learn that the first SMF network element needs to be triggered to establish a user plane resource for the first session. Further, the second AMF network element performs service request procedure processing based on the service request message, to trigger the first SMF network element to establish the user plane resource for the first session. Further, after step S412, the second SMF network element may send a fourth message to the second AMF network element based on the address of the second AMF network element or the identifier of the second AMF. In this way, after receiving the service request message from the terminal, the second AMF network element may further trigger the second SMF network element to establish a user plane resource for a second session.

In the second possible implementation of this embodiment, the first message does not include the first session management message. In this case, after receiving the service request message, the second AMF network element may obtain the identifier of the first SMF network element and the identifier of the second SMF network element from the database (updated in step S413). In this way, the second AMF network element may learn that the session corresponding to the first SMF network element and the session corresponding to the second SMF network element have downlink services. The second AMF network element sends a respective second message to the first SMF network element and the second SMF network element. The second AMF network element receives the first session management message from the first SMF network element. The first session management message includes the identifier of the first session, and the identifier of the first session associates the first session with the first SMF network element. Further, the second AMF network element receives a second session management message from the second SMF network element. The second session management message includes an identifier of a second session, and the identifier of the second session associates the second session with the second SMF network element. In this way, the second AMF network element may learn that the first and second SMF network elements need to be triggered to establish a user plane resource for a corresponding session, and correspondingly trigger the first SMF network element to establish a user plane resource for the first session, and trigger the second SMF network element to establish a user plane resource for the second session.

In this way, when the terminal has a plurality of sessions associated with a plurality of SMFs, even though the second SMF network element and the first SMF network element initially select different AMF network elements to replace the first AMF network element, it can be ensured that the second AMF network element triggering paging finally serves the terminal, thereby avoiding a procedure conflict caused by a plurality of AMF network elements serving one terminal.

Figure 8:
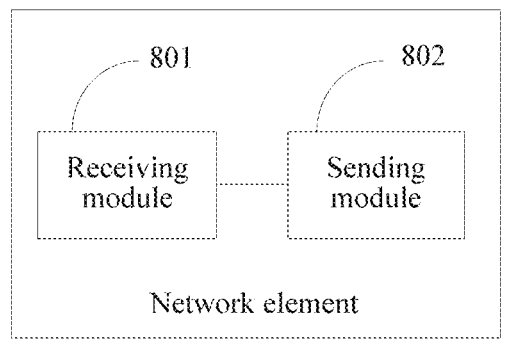
FIG. 8 is a schematic structural diagram of a network element according to an embodiment of this application.

Referring to FIG. 8, FIG. 8 is a schematic structural diagram of a network element according to an embodiment of this application. The network element may be used by a second AMF network element to implement the embodiment in FIG. 2, FIG. 3A and FIG. 3B, or FIG. 7. As shown in FIG. 8, the network element includes:

a receiving module 801, configured to learn, from a first session management function SMF network element, that a first AMF network element serving a terminal is unavailable, where the receiving module 801 is further configured to obtain a context of the terminal from a database, where the context of the terminal includes an identifier of the first SMF network element and an identifier of a second SMF network element; and a sending module 802, configured to page the terminal, and send an identifier of the second AMF network element and a paging status indication to the database to update the context of the terminal, where the paging status indication indicates that the terminal is paged by the second AMF network element, where the receiving module 801 is further configured to receive a service request message from the terminal, where the service request message is used for establishment of a user plane resource for a session of the terminal.

Optionally, the receiving module 801 is specifically configured to: receive a first message from the first SMF network element, where the first message includes a permanent identifier of the terminal and a cause value, the permanent identifier is used for acquisition of the context of the terminal, and the cause value indicates that the first AMF network element is unavailable.

Optionally, the sending module 802 is further configured to: when the first message does not include a session management message, further send the identifier of the first SMF to the database to update the context of the terminal.

Optionally, the sending module 802 is specifically configured to: send a paging message to the terminal, where the paging message includes the identifier of the second AMF network element, or includes a temporary identifier of the terminal, and the temporary identifier includes the identifier of the second AMF network element.

Optionally, the receiving module 801 is further configured to: obtain the identifier of the first SMF network element and the identifier of the second SMF network element from the database.

The sending module 802 is further configured to: send a respective second message to the first SMF network element and the second SMF network element.

The receiving module 801 is further configured to: receive a first session management message from the first SMF network element, where the first session management message includes an identifier of a first session, and the identifier of the first session associates the first session with the first SMF network element; and receive a second session management message from the second SMF network element, where the second session management message includes an identifier of a second session, and the identifier of the second session associates the second session with the second SMF network element.

Figure 9:
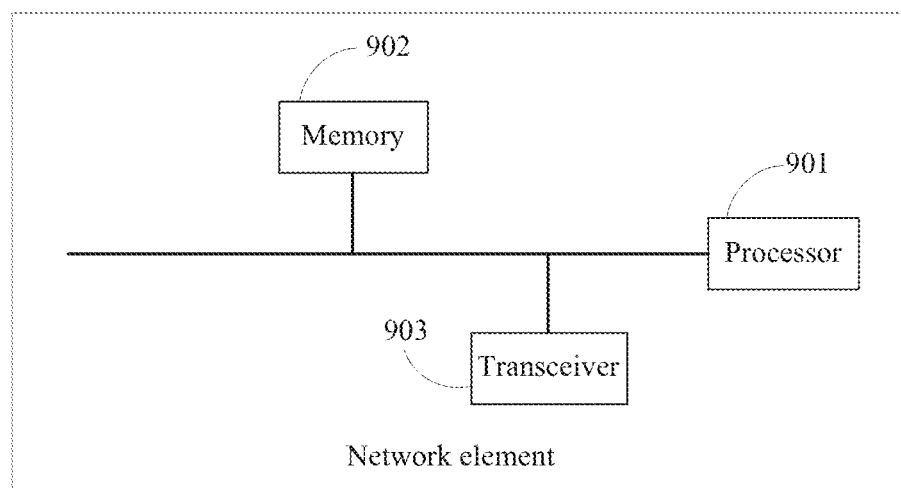
FIG. 9 is a schematic structural diagram of another network element according to an embodiment of this application.

Referring to FIG. 9, FIG. 9 is a schematic structural diagram of another network element according to an embodiment of this application. As shown in FIG. 9, the network element includes a processor 901, a memory 902, and a transceiver 903. The processor 901 is connected to the memory 902 and the transceiver 903. For example, the processor 901 may be connected to the memory 902 and the transceiver 903 by using a bus. Specifically, the network element may be a second AMF network element.

The processor 901 is configured to support the second AMF network element in performing corresponding functions in the method in FIG. 2, FIG. 3A and FIG. 3B, or FIG. 7. The processor 901 may be a central processing unit (CPU), a network processor (NP), a hardware chip, or any combination thereof. The hardware chip may be an application-specific integrated circuit (ASIC), a programmable logic device (PLD), or a combination thereof. The PLD may be a complex programmable logic device (CPLD), a field-programmable logic gate array (FPGA), a generic array logic (GAL), or any combination thereof.

The memory 902 is configured to store program code and the like. The memory 902 may include a volatile memory, for example, a random access memory (RAM). The memory 902 may alternatively include a non-volatile memory, for example, a read-only memory (ROM), a flash memory, a HDD, or a SSD. The memory 902 may alternatively include a combination of the foregoing memories.

The transceiver 903 may be a communications module or a transceiver circuit, and configured to transmit information such as data and signaling between a network device and a terminal device.

The processor 901 may invoke the program code to perform the following operations:

learning, by using the transceiver 903 from a first session management function SMF network element, that a first AMF network element serving a terminal is unavailable;

obtaining, by using the transceiver 903, a context of the terminal from a database, where the context of the terminal includes an identifier of the first SMF network element and an identifier of a second SMF network element;

paging, by using the transceiver 903, the terminal, and sending an identifier of the second AMF network element and a paging status indication to the database to update the context of the terminal, where the paging status indication indicates that the terminal is paged by the second AMF network element; and receiving, by using the transceiver 903, a service request message from the terminal, where the service request message is used for establishment of a user plane resource for a session of the terminal.

Optionally, in order to learn, from the first SMF network element, that the first AMF network element serving the terminal is unavailable, the processor 901 is specifically configured to: receive, by using the transceiver 903, a first message from the first SMF network element, where the first message includes a permanent identifier of the terminal and a cause value, the permanent identifier is used for acquisition of the context of the terminal, and the cause value indicates that the first AMF network element is unavailable.

Optionally, the processor 901 is further configured to: when the first message does not include a session management message, further send, by using the transceiver 903, the identifier of the first SMF network element to the database to update the context of the terminal.

Optionally, in order to page the terminal, the processor 901 is specifically configured to: send, by using the transceiver 903, a paging message to the terminal, where the paging message includes the identifier of the second AMF network element or a temporary identifier of the terminal, and the temporary identifier includes the identifier of the second AMF network element.

Optionally, the processor 901 is further configured to: obtain, by using the transceiver 903, the identifier of the first SMF network element and the identifier of the second SMF network element from the database; send, by using the transceiver 903, a respective second message to the first SMF network element and the second SMF network element; receive, by using the transceiver 903, a first session management message from the first SMF network element, where the first session management message includes an identifier of a first session, and the identifier of the first session associates the first session with the first SMF network element; and receive, by using the transceiver 903, a second session management message from the second SMF network element, where the second session management message includes an identifier of a second session, and the identifier of the second session associates the second session with the second SMF network element.

Figure 10:
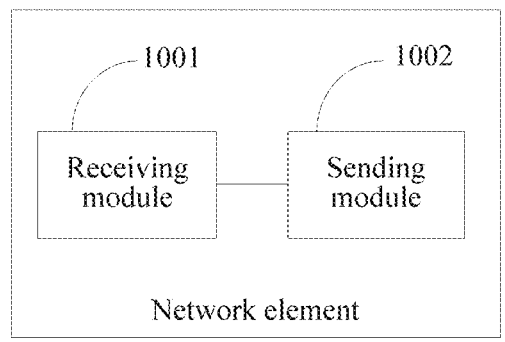
FIG. 10 is a schematic structural diagram of another network element according to an embodiment of this application.

Referring to FIG. 10, FIG. 10 is a schematic structural diagram of another network element according to an embodiment of this application. The network element may be used by a third AMF network element to implement the embodiment in FIG. 6A and FIG. 6B. As shown in FIG. 10, the network element includes:

a receiving module 1001, configured to obtain a context of a terminal from a database after receiving a service request message of the terminal from a base station, where the context of the terminal includes an identifier of a second AMF network element and a cause value, and the cause value indicates that the first AMF is unavailable; and a sending module 1002, configured to send the service request message to the second AMF network element, where the service request message is used for establishment of a user plane resource for a session of the terminal.

Figure 11:
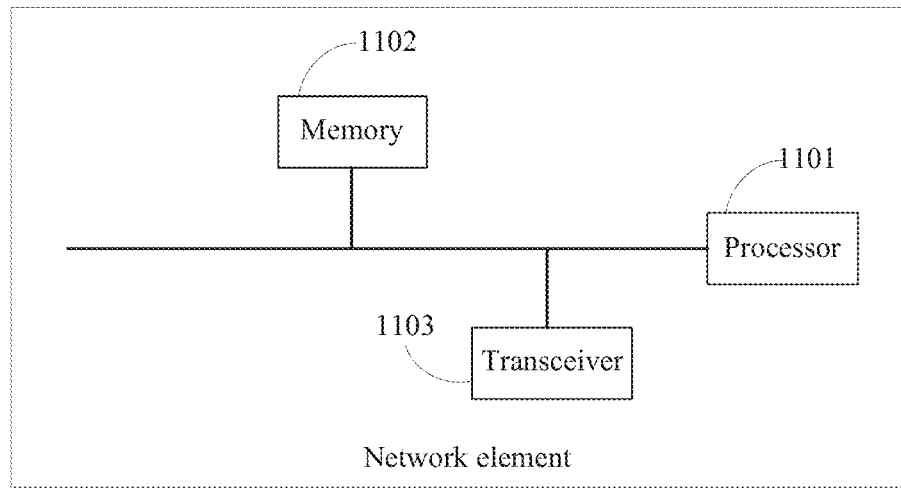
FIG. 11 is a schematic structural diagram of another network element according to an embodiment of this application.

Referring to FIG. 11, FIG. 11 is a schematic structural diagram of another network element according to an embodiment of this application. As shown in FIG. 11, the network element includes a processor 1101, a memory 1102, and a transceiver 1103. The processor 1101 is connected to the memory 1102 and the transceiver 1103. For example, the processor 1101 may be connected to the memory 1102 and the transceiver 1103 by using a bus. Specifically, the network element may be a third AMF network element.

The processor 1101 is configured to support the third AMF network element in performing corresponding functions in the method in FIG. 6A and FIG. 6B. The processor 1101 may be a CPU, a NP, a hardware chip, or any combination thereof. The hardware chip may be an ASIC, a PLD, or a combination thereof. The PLD may be a CPLD, a FPGA, a GAL, or any combination thereof.

The memory 1102 is configured to store program code and the like. The memory 1102 may include a volatile memory, for example, a RAM. The memory 1102 may alternatively include a non-volatile memory, for example, a ROM, a flash memory, a HDD, or a SSD. The memory 1102 may alternatively include a combination of the foregoing memories.

The transceiver 1103 may be a communications module or a transceiver circuit, and configured to transmit information such as data and signaling between a network device and a terminal device.

The processor 1101 may invoke the program code to perform the following operations:

obtaining, by using the transceiver 1103, a context of a terminal from a database after receiving a service request message of the terminal from a base station, where the context of the terminal includes an identifier of a second AMF network element and a cause value, and the cause value indicates that the first AMF is unavailable; and sending, by using the transceiver 1103, the service request message to the second AMF network element, where the service request message is used for establishment of a user plane resource for a session of the terminal.

Figure 12:
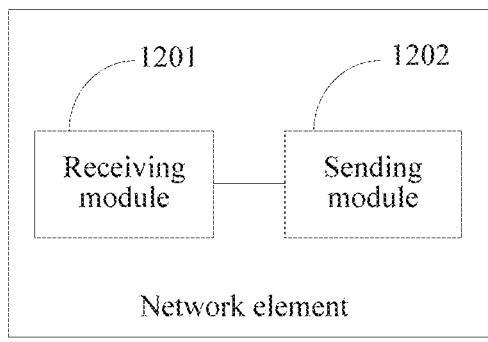
FIG. 12 is a schematic structural diagram of another network element according to an embodiment of this application.

Referring to FIG. 12, FIG. 12 is a schematic structural diagram of another network element according to an embodiment of this application. The network element may be used by a third AMF network element to implement the embodiment in FIG. 2, FIG. 3A and FIG. 3B, or FIG. 7. As shown in FIG. 12, the network element includes:

a receiving module 1201, configured to learn, from a second SMF network element, that a first AMF network element serving a terminal is unavailable, where the receiving module 1201 is further configured to obtain a context of the terminal from a database, where the context of the terminal includes an identifier of a second AMF network element and a paging status indication, and the paging status indication indicates that the terminal is paged by the second AMF network element; and a sending module 1202, configured to: send an address of the second AMF network element or the identifier of the second AMF network element to the second SMF network element, or send an identifier of the second SMF network element to the database, to update the context of the terminal.

Figure 13:
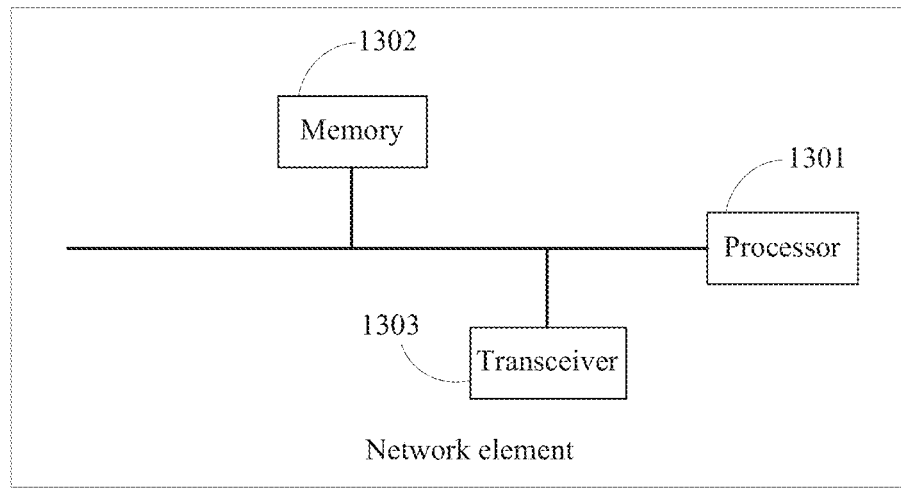
FIG. 13 is a schematic structural diagram of another network element according to an embodiment of this application.

Referring to FIG. 13, FIG. 13 is a schematic structural diagram of another network element according to an embodiment of this application. As shown in FIG. 13, the network element includes a processor 1301, a memory 1302, and a transceiver 1303. The processor 1301 is connected to the memory 1302 and the transceiver 1303. For example, the processor 1301 may be connected to the memory 1302 and the transceiver 1303 by using a bus. Specifically, the network element may be a third AMF network element.

The processor 1301 is configured to support the third AMF network element in performing corresponding functions in the method in FIG. 2, FIG. 3A and FIG. 3B, or FIG. 7. The processor 1301 may be a CPU, a NP, a hardware chip, or any combination thereof. The hardware chip may be an ASIC, a PLD, or a combination thereof. The PLD may be a CPLD, a FPGA, a GAL, or any combination thereof.

The memory 1302 is configured to store program code and the like. The memory 1302 may include a volatile memory, for example, a RAM. The memory 1302 may alternatively include a non-volatile memory, for example, a ROM, a flash memory, a HDD, or a SSD. The memory 1302 may alternatively include a combination of the foregoing memories.

The transceiver 1303 may be a communications module or a transceiver circuit, and configured to transmit information such as data and signaling between a network device and a terminal device.

The processor 1301 may invoke the program code to perform the following operations:

learning, by using the transceiver 1303 from a second SMF network element, that a first AMF network element serving a terminal is unavailable;

obtaining, by using the transceiver 1303, a context of the terminal from a database, where the context of the terminal includes an identifier of a second AMF network element and a paging status indication, and the paging status indication indicates that the terminal is paged by the second AMF network element; and sending, by using the transceiver 1303, an address of the second AMF network element or the identifier of the second AMF network element to the second SMF network element, or sending an identifier of the second SMF network element to the database, to update the context of the terminal.

Figure 14:
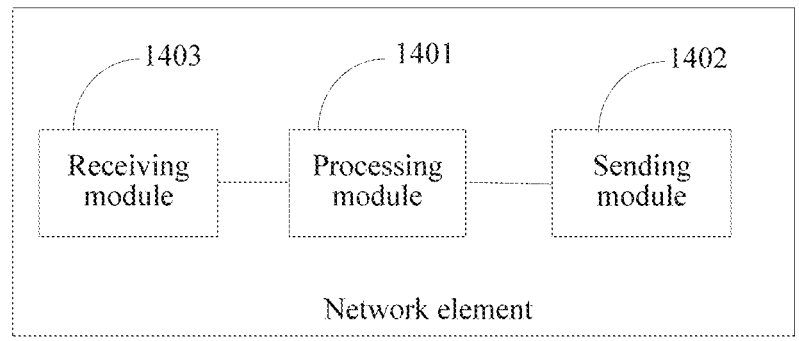
FIG. 14 is a schematic structural diagram of another network element according to an embodiment of this application.

Referring to FIG. 14, FIG. 14 is a schematic structural diagram of another network element according to an embodiment of this application. The network element may be used by a first SMF network element or a second SMF network element to implement the embodiments in FIG. 2 to FIG. 7. As shown in FIG. 14, the network element includes:

a processing module 1401, configured to obtain a pool identifier of an AMF pool to which a first AMF network element belongs.

The processing module 1401 is further configured to: when the first AMF network element is unavailable, determine, based on the pool identifier, a second AMF network element belonging to the same AMF pool as the first AMF network element.

The processing module 1401 is further configured to trigger the second AMF network element to obtain a context of a terminal to page the terminal.

Optionally, the processing module 1401 is specifically configured to: search, based on the pool identifier, locally stored AMF information for a second AMF network element having the same pool identifier as the first AMF network element, where the AMF information includes an association between the second AMF network element and the pool identifier.

Optionally, the network element further includes a sending module 1402 and a receiving module 1403.

In order to determine, based on the pool identifier, the second AMF network element belonging to the same AMF pool as the first AMF network element: the sending module 1402 is configured to send a first query request message to a network repository function NRF entity, where the first query request message carries the pool identifier; the receiving module 1403 is configured to receive an address of the second AMF network element or an identifier of the second AMF network element from the NRF entity.

Alternatively, in order to determine, based on the pool identifier, the second AMF network element belonging to the same AMF pool as the first AMF network element: the sending module 1402 is configured to send a second query request message to a database, where the second query request message carries the pool identifier; the receiving module 1403 is configured to receive an address of the second AMF network element or an identifier of the second AMF network element from the database.

Optionally, the network element further includes the receiving module 1403.

In order to obtain a pool identifier of an AMF pool to which a first AMF network element belongs: the receiving module 1403 is configured to receive the pool identifier from the first AMF network element.

Alternatively, in order to determine, based on the pool identifier, the second AMF network element belonging to the same AMF pool as the first AMF network element: the sending module 1402 is configured to send a third message to a third AMF network element based on the pool identifier. The first AMF network element and the third AMF network element belong to the same AMF pool, the third message carries a cause value, and the cause value indicates that the first AMF network element is unavailable; the receiving module 1403 is configured to receive the address of the second AMF network element or the identifier of the second AMF network element from the third AMF network element.

Optionally, the processing module 1401 is further configured to: cache a session management message.

The network element further includes: the receiving module 1402, configured to receive a second message from the second AMF network element; and the sending module 1403, configured to send the cached session management message to the second AMF network element, where the session management message includes an identifier of a session, and the identifier of the session associates the session with the SMF network element.

Optionally, the network element further includes the sending module 1402.

In order to trigger the second AMF network element to obtain a context of a terminal to page the terminal: the sending module 1402 is configured to send a first message to the second AMF network element. The first message includes a permanent identifier of the terminal and the cause value, the permanent identifier is used for acquisition of the context of the terminal, and the cause value indicates that the first AMF is unavailable.

Figure 15:
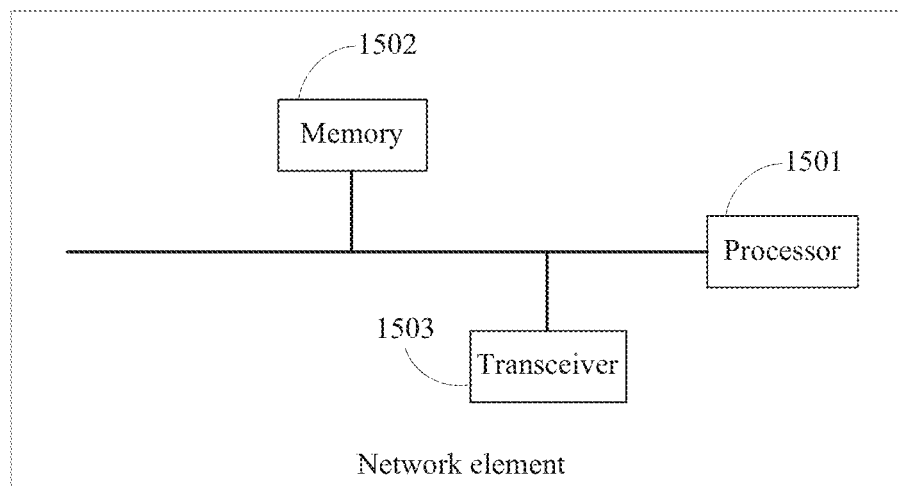
FIG. 15 is a schematic structural diagram of another network element according to an embodiment of this application.

Referring to FIG. 15, FIG. 15 is a schematic structural diagram of another network element according to an embodiment of this application. As shown in FIG. 15, the network element includes a processor 1501, a memory 1502, and a transceiver 1503. The processor 1501 is connected to the memory 1502 and the transceiver 1503. For example, the processor 1501 may be connected to the memory 1502 and the transceiver 1503 by using a bus. Specifically, the network element may be a first SMF network element or a second SMF network element.

The processor 1501 is configured to support the first SMF network element or the second SMF network element in performing corresponding functions in the methods in FIG. 2 to FIG. 7. The processor 1501 may be a CPU, a NP, a hardware chip, or any combination thereof. The hardware chip may be an ASIC, a PLD, or a combination thereof. The PLD may be a CPLD, a FPGA, a GAL, or any combination thereof.

The memory 1502 is configured to store program code and the like. The memory 1502 may include a volatile memory, for example, a RAM. The memory 1502 may alternatively include a non-volatile memory, for example, a ROM, a flash memory, a HDD, or a SSD. The memory 1502 may alternatively include a combination of the foregoing memories.

The transceiver 1503 may be a communications module or a transceiver circuit, and configured to transmit information such as data and signaling between a network device and a terminal device.

The processor 1501 may invoke the program code to perform the following operations:

obtaining a pool identifier of an AMF pool to which a first AMF network element belongs;

when the first AMF network element is unavailable, determining, based on the pool identifier, a second AMF network element belonging to the same AMF pool as the first AMF network element; and triggering the second AMF network element to obtain a context of a terminal to page the terminal.

Optionally, in order to determine, based on the pool identifier, the second AMF network element belonging to the same AMF pool as the first AMF network element, the processor 1501 is specifically configured to: search, based on the pool identifier, locally stored AMF information for a second AMF network element having the same pool identifier as the first AMF network element, where the AMF information includes an association between the second AMF network element and the pool identifier.

Optionally, in order to determine, based on the pool identifier, the second AMF network element belonging to the same AMF pool as the first AMF network element, the processor 1501 is specifically configured to: send, by using the transceiver 1503, a first query request message to a network repository function NRF entity, where the first query request message carries the pool identifier; and receive, by using the transceiver 1503, an address of the second AMF network element or an identifier of the second AMF network element from the NRF entity.

Optionally, in order to determine, based on the pool identifier, the second AMF network element belonging to the same AMF pool as the first AMF network element, the processor 1501 is specifically configured to: send, by using the transceiver 1503, a second query request message to a database, where the second query request message carries the pool identifier; and receive, by using the transceiver 1503, an address of the second AMF network element or an identifier of the second AMF network element from the database.

Optionally, in order to obtain the pool identifier of the AMF pool to which the first AMF network element belongs, the processor 1501 is specifically configured to: receive, by using the transceiver 1503, the pool identifier from the first AMF network element.

Optionally, in order to determine, based on the pool identifier, the second AMF network element belonging to the same AMF pool as the first AMF network element, the processor 1501 is specifically configured to: send, by using the transceiver 1503, a third message to a third AMF network element based on the pool identifier, where the first AMF network element and the third AMF network element belong to the same AMF pool, the third message carries a cause value, and the cause value indicates that the first AMF network element is unavailable; and receive, by using the transceiver 1503, the address of the second AMF network element or the identifier of the second AMF network element from the third AMF network element.

Optionally, the processor 1501 is further configured to: cache a session management message; and send, by using the transceiver 1503, the cached session management message to the second AMF network element after receiving a second message from the second AMF network element, where the session management message includes an identifier of a session, and the identifier of the session associates the session with the SMF network element.

Optionally, in order to trigger the second AMF network element to obtain the context of the terminal to page the terminal, the processor 1501 is specifically configured to: send, by using the transceiver 1503, a first message to the second AMF network element, where the first message includes a permanent identifier of the terminal and the cause value, the permanent identifier is used for acquisition of the context of the terminal, and the cause value indicates that the first AMF is unavailable.

Figure 16:
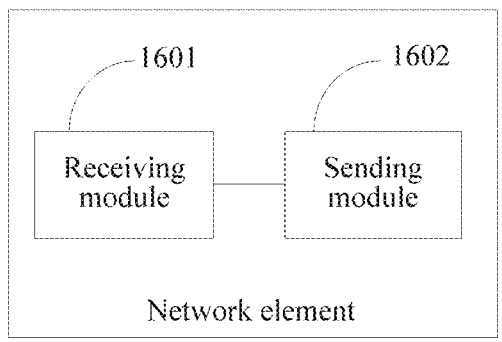
FIG. 16 is a schematic structural diagram of another network element according to an embodiment of this application.

Referring to FIG. 16, FIG. 16 is a schematic structural diagram of another network element according to an embodiment of this application. The network element may be used by a second AMF network element to implement the embodiment in FIG. 6A and FIG. 6B. As shown in FIG. 16, the network element includes:

a receiving module 1601, configured to receive a first message from an SMF network element, where the first message includes a cause value, and the cause value indicates that a first AMF serving a terminal is unavailable; and a sending module 1602, configured to page the terminal, and send an identifier of the second AMF network element and the cause value to a database to update a context of the terminal.

The receiving module 1601 is further configured to receive a service request message from a third AMF network element. The service request message is used for establishment of a user plane resource for a session of the terminal.

Figure 17:
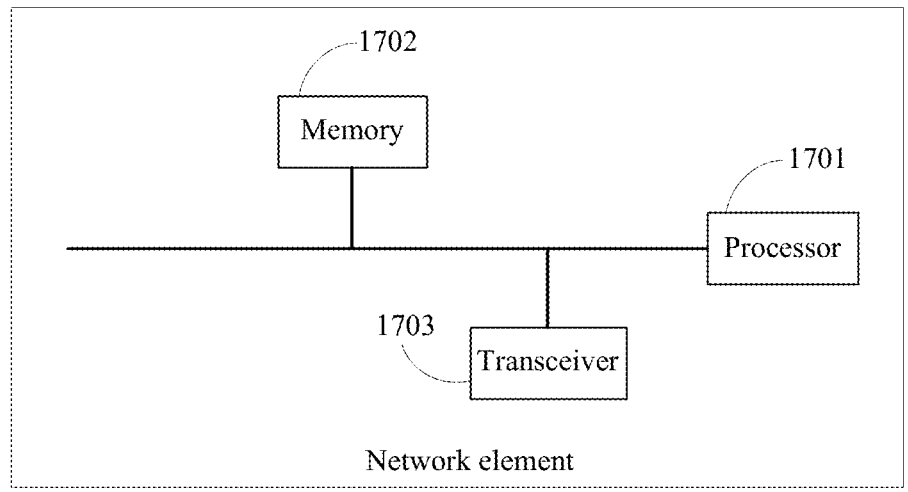
FIG. 17 is a schematic structural diagram of another network element according to an embodiment of this application.

Referring to FIG. 17, FIG. 17 is a schematic structural diagram of another network element according to an embodiment of this application. As shown in FIG. 17, the network element includes a processor 1701, a memory 1702, and a transceiver 1703. The processor 1701 is connected to the memory 1702 and the transceiver 1703. For example, the processor 1701 may be connected to the memory 1702 and the transceiver 1703 by using a bus. Specifically, the network element may be a second AMF network element.

The processor 1701 is configured to support the second AMF network element in performing corresponding functions in the method in FIG. 6A and FIG. 6B. The processor 1701 may be a CPU, a NP, a hardware chip, or any combination thereof. The hardware chip may be an ASIC, a PLD, or a combination thereof. The PLD may be a CPLD, a FPGA, a GAL, or any combination thereof.

The memory 1702 is configured to store program code and the like. The memory 1702 may include a volatile memory, for example, a RAM. The memory 1702 may alternatively include a non-volatile memory, for example, a ROM, a flash memory, a HDD, or a SSD. The memory 1702 may alternatively include a combination of the foregoing memories.

The transceiver 1703 may be a communications module or a transceiver circuit, and configured to transmit information such as data and signaling between a network device and a terminal device.

The processor 1701 may invoke the program code to perform the following operations:

receiving, by using the transceiver 1703, a first message from an SMF network element, where the first message includes a cause value, and the cause value indicates that the first AMF serving a terminal is unavailable;

paging, by using the transceiver 1703, the terminal and sending an identifier of the second AMF network element and the cause value to a database to update a context of the terminal; and receiving, by using the transceiver 1703, a service request message from a third AMF network element, where the service request message is used for establishment of a user plane resource for a session of the terminal.

Figure 18:
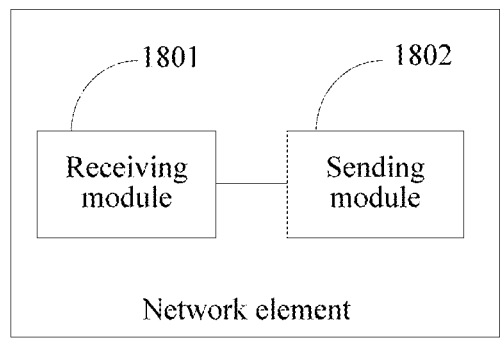
FIG. 18 is a schematic structural diagram of another network element according to an embodiment of this application.

Referring to FIG. 18, FIG. 18 is a schematic structural diagram of another network element according to an embodiment of this application. The network element may be used by a second AMF network element to implement the embodiment in FIG. 4 or FIG. 5. As shown in FIG. 18, the network element includes:

a receiving module 1801, configured to learn, from an SMF network element, that a first AMF network element serving a terminal is unavailable; and a sending module 1802, configured to send a paging message to the terminal, where the paging message includes an identifier of the second AMF network element or a temporary identifier of the terminal, and the temporary identifier includes the identifier of the second AMF network element.

The receiving module is further configured to receive a service request message from the terminal. The service request message is used for establishment of a user plane resource for a session of the terminal.

Figure 19:
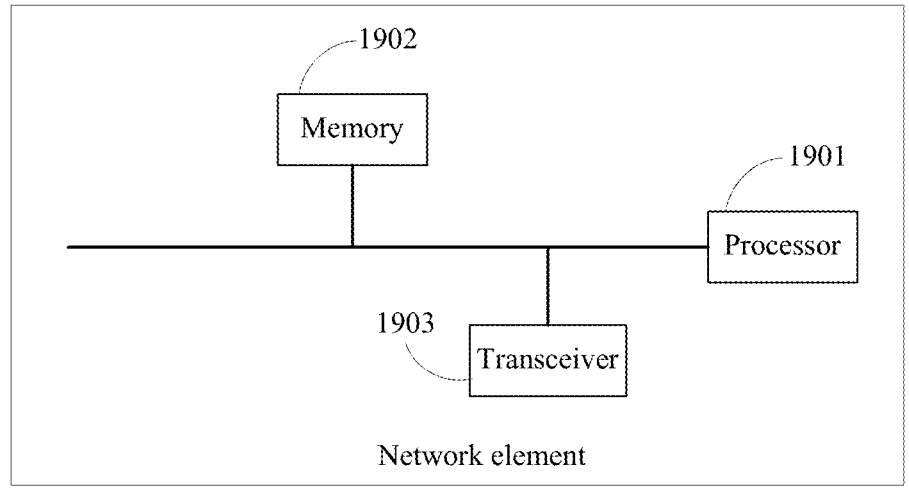
FIG. 19 is a schematic structural diagram of another network element according to an embodiment of this application.

Referring to FIG. 19, FIG. 19 is a schematic structural diagram of another network element according to an embodiment of this application. As shown in FIG. 19, the network element includes a processor 1901, a memory 1902, and a transceiver 1903. The processor 1901 is connected to the memory 1902 and the transceiver 1903. For example, the processor 1901 may be connected to the memory 1902 and the transceiver 1903 by using a bus. Specifically, the network element may be a second AMF network element.

The processor 1901 is configured to support the second AMF network element in performing corresponding functions in the method in FIG. 4 or FIG. 5. The processor 1901 may be a CPU, a NP, a hardware chip, or any combination thereof. The hardware chip may be an ASIC, a PLD, or a combination thereof. The PLD may be a CPLD, a FPGA, a GAL, or any combination thereof.

The memory 1902 is configured to store program code and the like. The memory 1902 may include a volatile memory, for example, a RAM. The memory 1902 may alternatively include a non-volatile memory, for example, a ROM, a flash memory, a HDD, or a SSD. The memory 1902 may alternatively include a combination of the foregoing memories.

The transceiver 1903 may be a communications module or a transceiver circuit, and configured to transmit information such as data and signaling between a network device and a terminal device.

The processor 1901 may invoke the program code to perform the following operations:

learning, by using the transceiver 1903 from an SMF network element, that a first AMF network element serving a terminal is unavailable;

sending, by using the transceiver 1903, a paging message to the terminal, where the paging message includes an identifier of the second AMF network element or a temporary identifier of the terminal, and the temporary identifier includes the identifier of the second AMF network element; and receiving, by using the transceiver 1903, a service request message from the terminal, where the service request message is used for establishment of a user plane resource for a session of the terminal.

A person of ordinary skill in the art may understand that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedures or functions according to the embodiments of the present disclosure are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a SSD), or the like.

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The foregoing storage medium may be a magnetic disk, an optical disc, a ROM, a RAM, or the like.

What is disclosed above is merely examples of embodiments of the present disclosure, and certainly is not intended to limit the protection scope of the present disclosure. Therefore, equivalent variations made in accordance with the claims of the present disclosure shall fall within the scope of the present disclosure.

What is claimed is:

1. A session processing method performed by a session management function (SMF) network element, comprising:
    obtaining, from a first access and mobility management function (AMF) network element serving a terminal, a pool identifier of an AMF pool comprising a plurality of AMF network elements including the first AMF network element and a second AMF network element;
    determining the first AMF network element is unavailable;
    sending, in response to the determination, a query request message to a network repository function (NRF) entity, wherein the first query request message carries the pool identifier;
    receiving an address of the second AMF network element or an identifier of the second AMF network element from the NRF entity; and
    triggering the second AMF network element to obtain a context of the terminal from an unstructured data storage function (UDSF) entity.

2. The method according to claim 1, further comprising:
    caching a session management message;
    receiving a first message from the second AMF network element; and
    sending the cached session management message to the second AMF network element in response to the received first message, wherein the session management message comprises an identifier of a session, and the identifier of the session associates the session with the SMF network element.

3. The method according to claim 1, wherein the step of triggering the second AMF network element to obtain the context of the terminal comprises:
    sending a first message to the second AMF network element, wherein the first message comprises a permanent identifier of the terminal and a cause value, the permanent identifier is used for acquisition of the context of the terminal, and the cause value indicates that the first AMF network element is unavailable.

4. A session management function (SMF) network element, comprising:
    an interface;
    a memory storing executable instructions;
    a processor configured to execute the executable instructions in the memory to:
        obtain, using the interface from a first access and mobility management function (AMF) network element serving a terminal, a pool identifier of an AMF pool comprising a plurality of AMF network elements including the first AMF network element and a second AMF network element;
        determine the first AMF network element is unavailable;
        send, using the interface in response to the determination, a query request message to a network repository function (NRF) entity, wherein the first query request message carries the pool identifier; and
        receive, using the interface from the NRF entity, an address of the second AMF network element or an identifier of the second AMF network element; and
        trigger the second AMF network element to obtain a context of the terminal from an unstructured data storage function (UDSF) entity.

5. The session management function network element according to claim 4, wherein the processor is further configured to execute the executable instructions in the memory to:
  cache a session management message;
  receive, using the interface, a first message from the second AMF network element; and
  send, using the interface, the cached session management message to the second AMF network element in response to the received first message, wherein the session management message comprises an identifier of a session, and the identifier of the session associates the session with the SMF network element.

6. The session management function network element according to claim 4, wherein in order to trigger the second AMF network element to obtain the context of the terminal, the processor is configured to execute the executable instructions in the memory to:
  send, using the interface, a first message to the second AMF network element, wherein the first message comprises a permanent identifier of the terminal and a cause value, the permanent identifier is used for acquisition of the context of the terminal, and the cause value indicates that the first AMF network element is unavailable.

7. A non-transitory computer-readable medium storing computer instructions for execution by one or more processors, wherein the computer instructions instruct the one or more processors to perform the operations of:
  obtaining, from a first access and mobility management function (AMF) network element serving a terminal, a pool identifier of an AMF pool comprising a plurality of AMF network elements including the first AMF network element and a second AMF network element;
  determining the first AMF network element is unavailable;
  sending, in response to the determination, a query request message to a network repository function (NRF) entity, wherein the first query request message carries the pool identifier;
  receiving an address of the second AMF network element or an identifier of the second AMF network element from the NRF entity; and
  triggering the second AMF network element to obtain a context of the terminal from an unstructured data storage function (UDSF) entity.

8. The non-transitory computer-readable medium according to claim 7, wherein the program further includes instructions to:
  caching a session management message;
  receiving a first message from the second AMF network element; and
  sending the cached session management message to the second AMF network element in response to the received first message, wherein the session management message comprises an identifier of a session, and the identifier of the session associates the session with a session management function (SMF) network element.

9. The non-transitory computer-readable medium according to claim 7, wherein in order to trigger the second AMF network element to obtain the context of the terminal, the program includes instructions to:
  sending a first message to the second AMF network element, wherein the first message comprises a permanent identifier of the terminal and a cause value, the permanent identifier is used for acquisition of the context of the terminal, and the cause value indicates that the first AMF network element is unavailable.

* * * * *